US012678700B2

(12) United States Patent
Kawabe et al.

(10) Patent No.: US 12,678,700 B2
(45) Date of Patent: Jul. 14, 2026

(54) AUTONOMOUS MOVING OBJECT AND INFORMATION PROCESSING METHOD

(71) Applicant: SONY GROUP CORPORATION, Tokyo (JP)

(72) Inventors: Yusuke Kawabe, Tokyo (JP); Junna Imai, Tokyo (JP); Hitoshi Hashimoto, Tokyo (JP); Takeshi Katayama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 160 days.

(21) Appl. No.: 18/261,280

(22) PCT Filed: Dec. 28, 2021

(86) PCT No.: PCT/JP2021/048959
§ 371 (c)(1),
(2) Date: Jul. 13, 2023

(87) PCT Pub. No.: WO2022/158279
PCT Pub. Date: Jul. 28, 2022

(65) Prior Publication Data
US 2024/0066420 A1     Feb. 29, 2024

(30) Foreign Application Priority Data

Jan. 22, 2021     (JP) ................................. 2021-009112

(51) Int. Cl.
*A63H 11/20*         (2006.01)
*G05D 1/00*          (2024.01)
(Continued)

(52) U.S. Cl.
CPC ........... *A63H 11/20* (2013.01); *G05D 1/0223* (2013.01); *H05B 45/10* (2020.01); *H05B 45/20* (2020.01); *A63H 2200/00* (2013.01)

(58) Field of Classification Search
CPC .... A63H 11/20; A63H 11/00; A63H 2200/00; A63H 33/22; G05D 1/0223; H05B 45/10; H05B 45/20; H05B 47/105
(Continued)

(56) References Cited

U.S. PATENT DOCUMENTS 5,902,166 A * 5/1999 Robb ........................ B60Q 1/34
6,620,024 B2 * 9/2003 Choi ....................... A63H 30/04
(Continued)

FOREIGN PATENT DOCUMENTS

JP         2003-60745 A      2/2003
JP         2003-71763 A      3/2003
(Continued)

OTHER PUBLICATIONS

International Search Report and Written Opinion of PCT Application No. PCT/JP2021/048959, issued on Mar. 22, 2022, 08 pages of ISRWO.

*Primary Examiner* — Ellis B. Ramirez
(74) *Attorney, Agent, or Firm* — CHIP LAW GROUP

(57)         ABSTRACT

The present technology relates to an autonomous moving object and an information processing method that make it possible to improve the ability in expression of the autonomous moving object. The autonomous moving object is an autonomous moving object that operates autonomously, and includes a light emission section that changes a color and brightness of a surface of the autonomous moving object, and a motion controlling section that controls a light emission pattern that is a pattern of the color and brightness of the light emission section, on the basis of a state of the autonomous moving object. The present technology can be applied, for example, to an autonomously movable robot that imitates a creature.

15 Claims, 18 Drawing Sheets

(51) Int. Cl.
    *H05B 45/10*        (2020.01)
    *H05B 45/20*        (2020.01)

(58) Field of Classification Search
    USPC ................ 700/245, 258; 318/568.12, 568.13
    See application file for complete search history.

(56)                 References Cited

U.S. PATENT DOCUMENTS

| | | | |
|---|---|---|---|
| 2004/0210345 A1* | 10/2004 | Noda | G05D 1/0088 |
| 2012/0025964 A1* | 2/2012 | Beggs | G08G 1/166 |
| 2019/0009181 A1* | 1/2019 | Kroyan | A63H 11/00 |
| 2019/0111563 A1* | 4/2019 | Stein | B25J 11/001 |
| 2020/0341480 A1* | 10/2020 | Jung | G05D 1/0223 |
| 2021/0174660 A1* | 6/2021 | Kamimura | G08B 5/36 |

FOREIGN PATENT DOCUMENTS

| | | | |
|---|---|---|---|
| JP | 2003266364 A | * | 9/2003 |
| JP | 2008-90013 A | | 4/2008 |
| JP | 3195058 U | | 12/2014 |
| JP | 2018528002 A | | 9/2018 |
| WO | WO-2013099299 A1 | | 7/2013 |

* cited by examiner

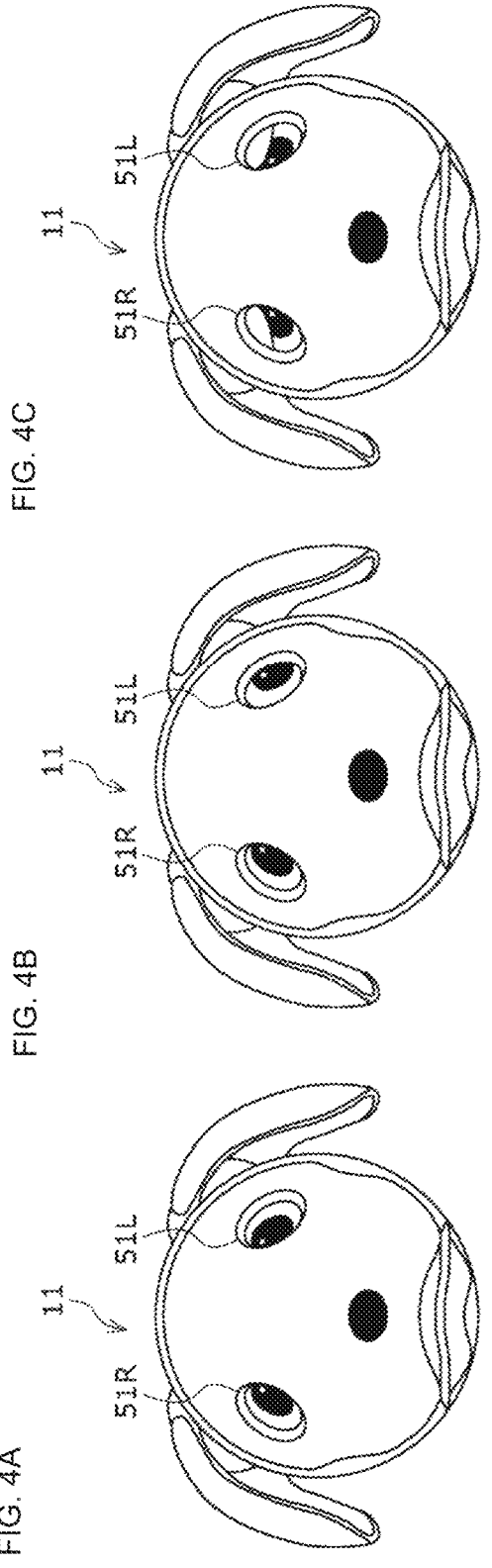

51L

11

51L

11

F I G . 6
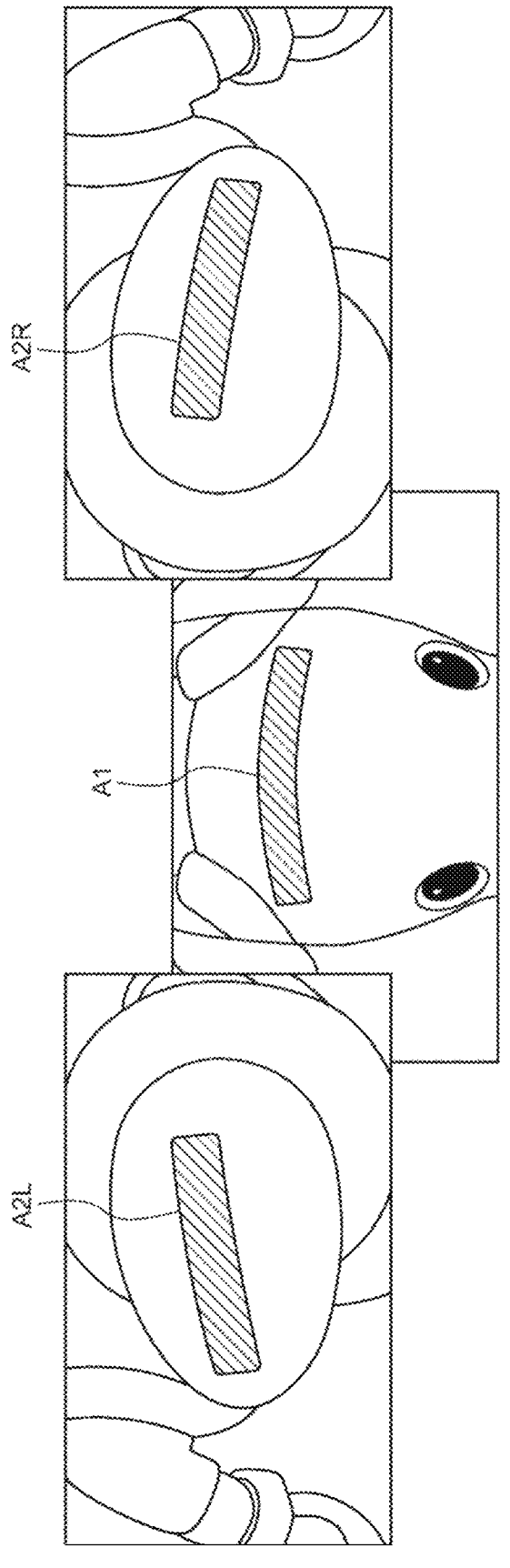

F I G . 7
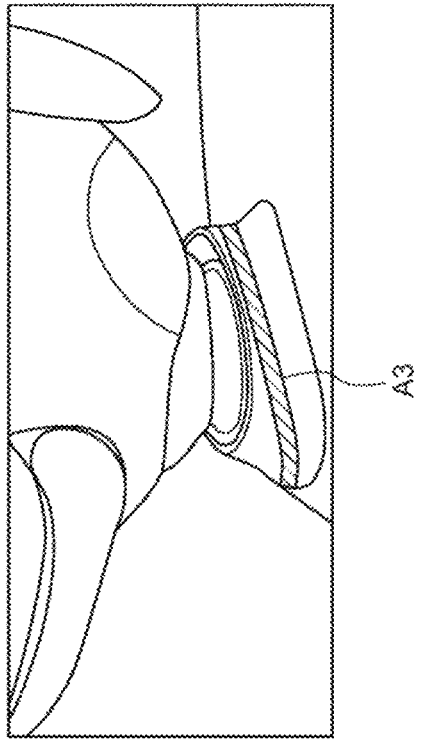
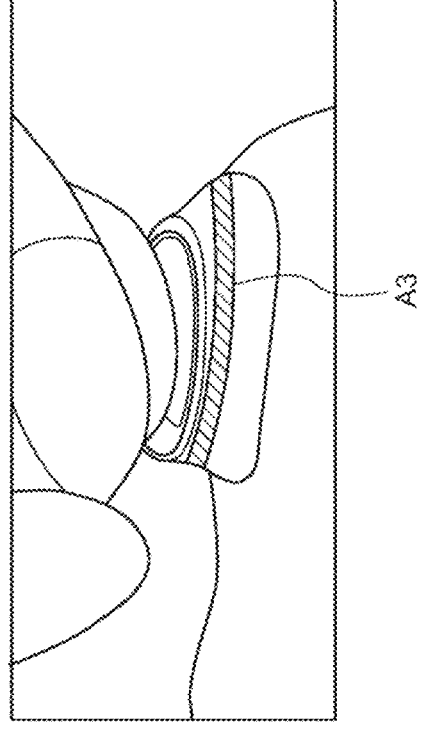

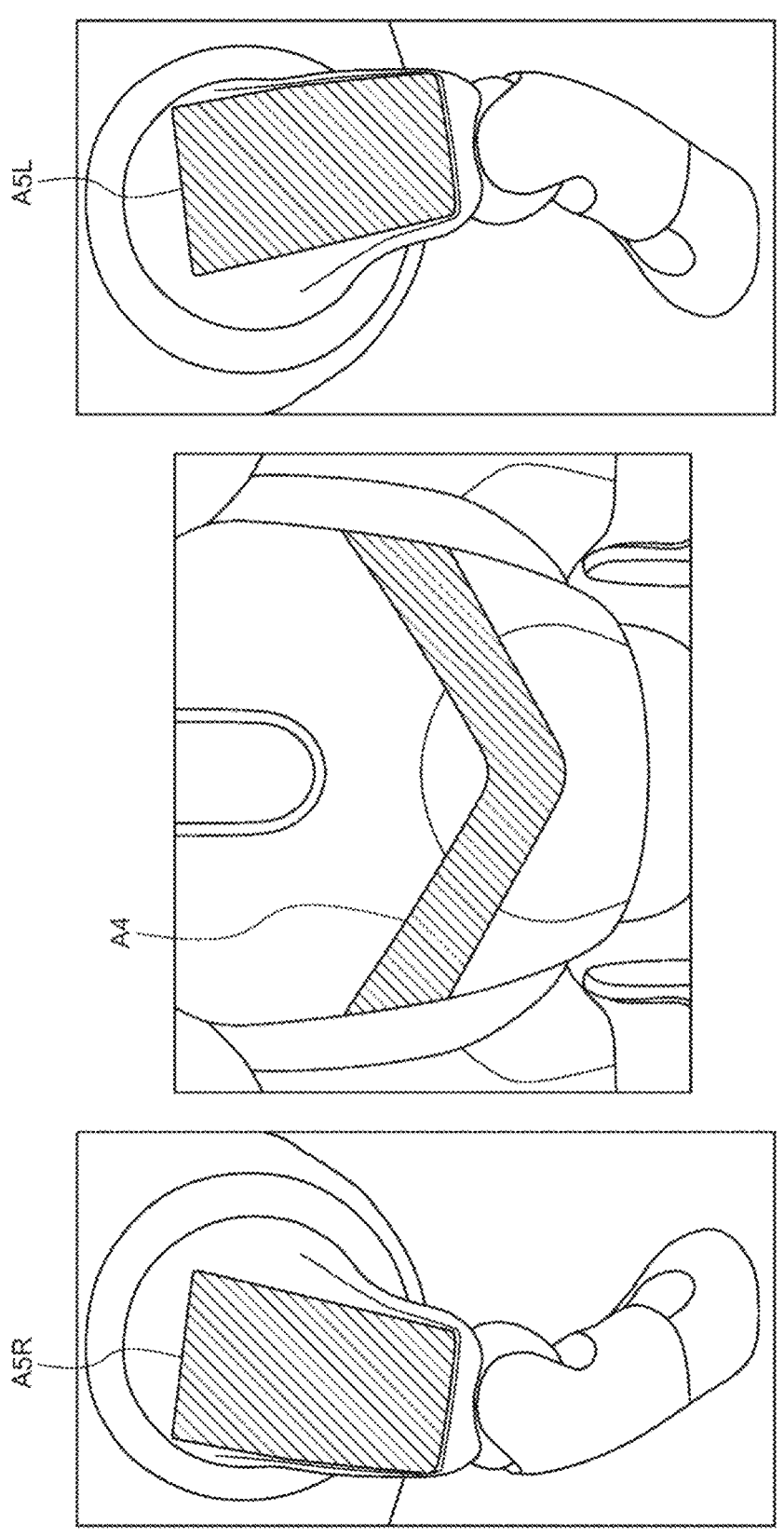
F I G . 8

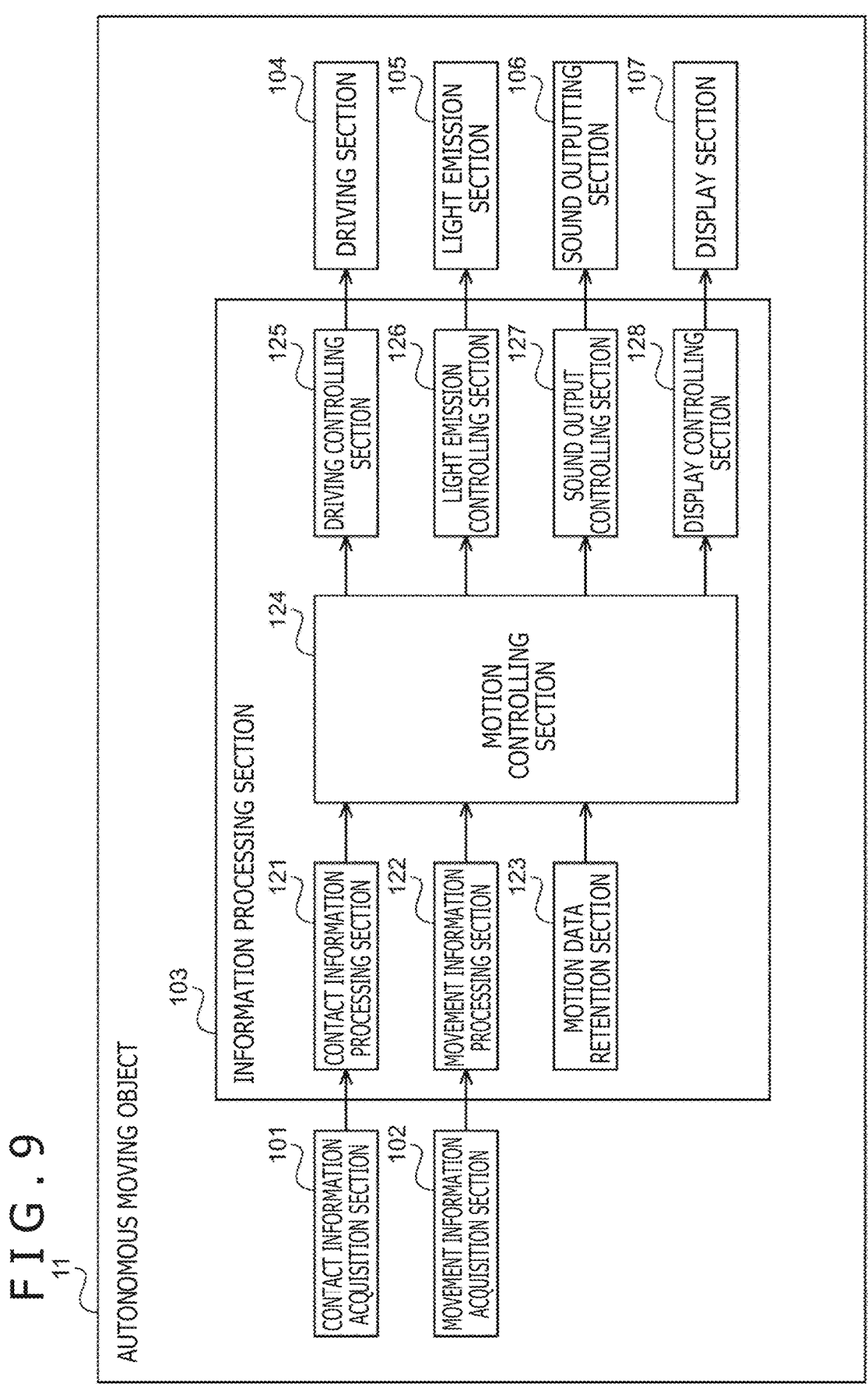
F I G . 9

F I G . 1 6
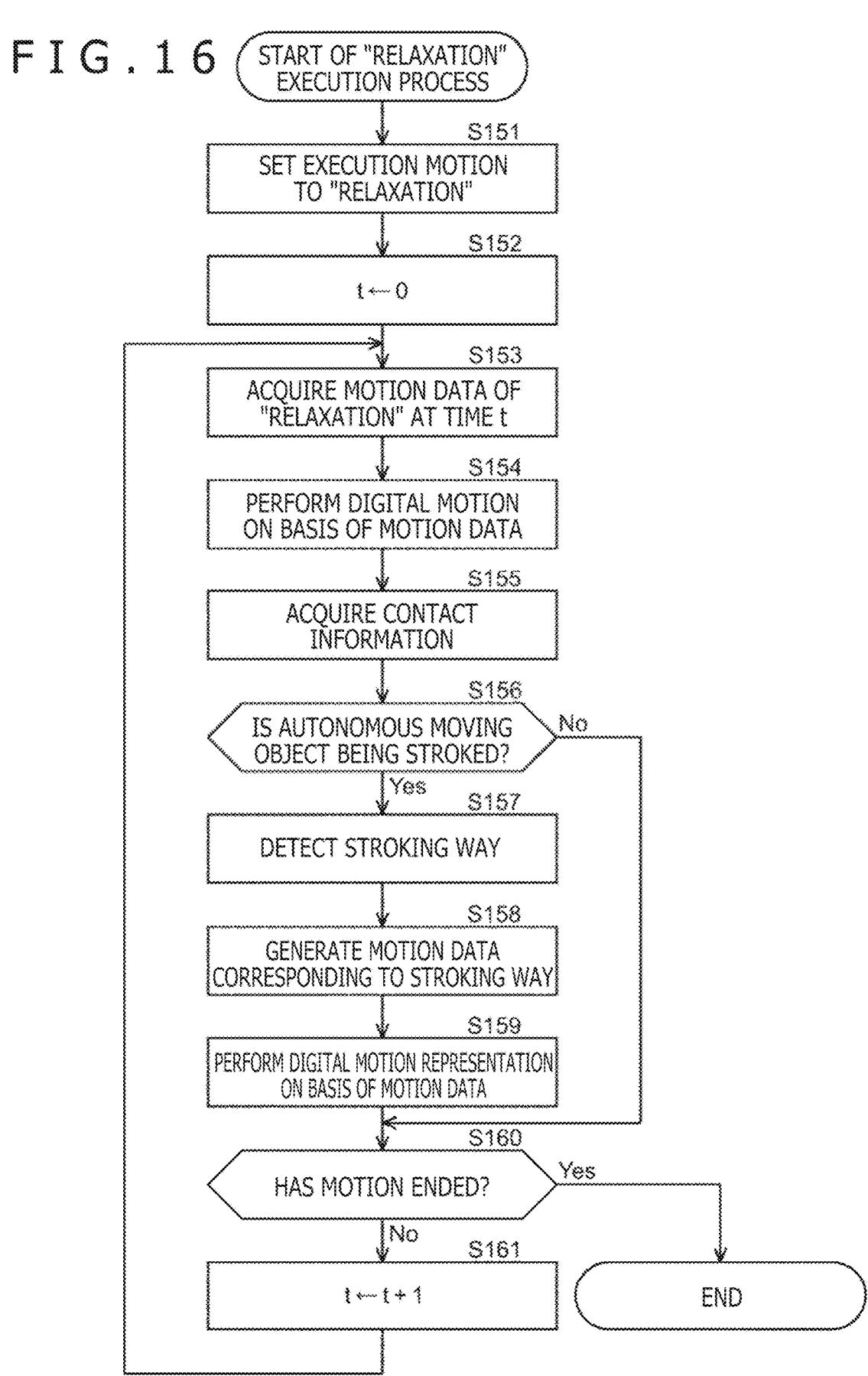

AUTONOMOUS MOVING OBJECT AND INFORMATION PROCESSING METHOD

CROSS REFERENCE TO RELATED APPLICATIONS

This application is a U.S. National Phase of International Patent Application No. PCT/JP2021/048959 filed on Dec. 28, 2021, which claims priority benefit of Japanese Patent Application No. JP 2021-009112 filed in the Japan Patent Office on Jan. 22, 2021. Each of the above-referenced applications is hereby incorporated herein by reference in its entirety.

TECHNICAL FIELD

The present technology relates to an autonomous moving object and an information processing method, and particularly to an autonomous moving object and an information processing method that improve the ability in expression.

BACKGROUND ART

In recent years, for an autonomous moving object such as an entertainment robot which is capable of interacting with its user, it is demanded to improve the ability in expression in order to improve the degree of satisfaction of the user.

Meanwhile, for example, a robot apparatus has been proposed in which a movement pattern is set on the basis of a result of analysis of music data and a movable portion is moved to music according to the set movement pattern (for example, refer to PTL 1).

CITATION LIST

Patent Literature

[PTL 1]
Japanese Patent Laid-Open No. 2008-90013

SUMMARY

Technical Problem

However, in a conventional autonomous moving object, for example, the representation of a movement is limited to that of a movement of a movable portion such as a joint portion.

The present technology has been made in view of such a situation as just described and improves the ability in expression of an autonomous moving object.

Solution to Problem

An autonomous moving object according to one aspect of the present technology is an autonomous moving object that operates autonomously, and includes a light emission section that changes a color and brightness of a surface of the autonomous moving object, and a motion controlling section that controls a light emission pattern that is a pattern of the color and brightness of the light emission section, on the basis of a state of the autonomous moving object.

An information processing method according to one aspect of the present technology includes controlling, on the basis of a state of an autonomous moving object that operates autonomously, a light emission pattern that is a pattern of a color and brightness of a light emission section that changes a color and brightness of a surface of the autonomous moving object.

In one aspect of the present technology, on the basis of a state of an autonomous moving object that operates autonomously, a light emission pattern that is a pattern of a color and brightness of a light emission section, which changes a color and brightness of a surface of the autonomous moving object, is controlled.

BRIEF DESCRIPTION OF DRAWINGS

FIGS. 4A, 4B, and 4C are views illustrating a function of displays provided in the autonomous moving object.

FIG. 6 is a view depicting examples of a light emission area of an exterior of the autonomous moving object.

FIG. 7 is a view depicting another example of the light emission area of the exterior of the autonomous moving object.

FIG. 8 is a view depicting further examples of the light emission area of the exterior of the autonomous moving object.

FIG. 9 is a block diagram depicting an example of a functional configuration of the autonomous moving object.

FIG. 16 is a flow chart illustrating a "relaxation" execution process.

DESCRIPTION OF EMBODIMENT

In the following, a mode for carrying out the present technology is described. The description is given in the following order.

1. Embodiment
2. Modifications
3. Others

1. EMBODIMENT

An embodiment of the present technology is described with reference to FIGS. 1, 2, 3, 4A, 4B, 4C, 5A, 5B, 6, 7, 8, 9, 10, 11, 12, 13, 14, 15, 16, 17A, 17B, 17C, and 17D.

Example of Configuration of Information Processing System 1

Figure 1:
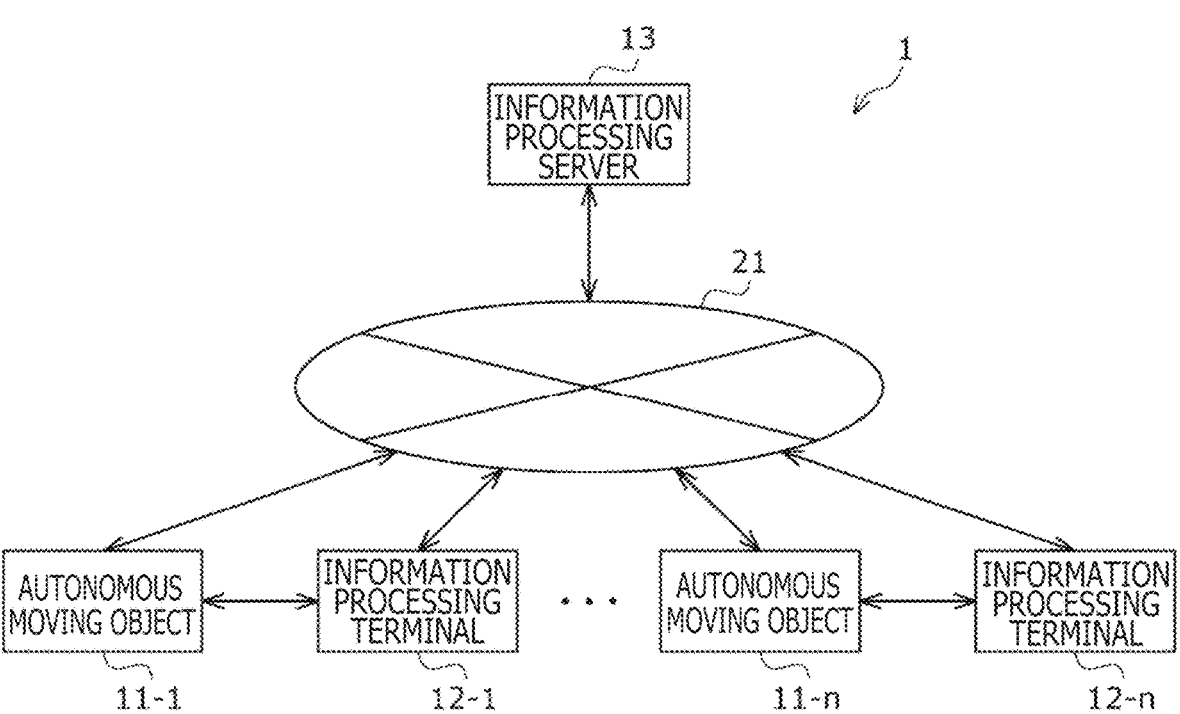
FIG. 1 is a block diagram depicting an embodiment of an information processing system to which the present technology is applied.

FIG. 1 is a block diagram depicting an embodiment of an information processing system 1 to which the present technology is applied.

The information processing system 1 includes autonomous moving objects 11-1 to 11-n, information processing terminals 12-1 to 12-n, and an information processing server 13.

It is to be noted that, in the following description, in a case where there is no necessity to individually distinguish the autonomous moving objects 11-1 to 11-n from one another, each of the autonomous moving objects 11-1 to 11-n is referred to simply as an autonomous moving object 11. In the following description, in a case where there is no necessity to individually distinguish the information processing terminals 12-1 to 12-n from one another, each of the information processing terminals 12-1 to 12-n is referred to simply as an information processing terminal 12.

Communication through a network 21 can be established between each autonomous moving object 11 and the information processing server 13, between each information processing terminal 12 and the information processing server 13, between each autonomous moving object 11 and each information processing terminal 12, between the autonomous moving objects 11, and between the information processing terminals 12. Direct communication without the intervention of the network 21 can also be established between each autonomous moving object 11 and each information processing terminal 12, between the autonomous moving objects 11, and between the information processing terminals 12.

The autonomous moving object 11 is an information processing apparatus that recognizes situations of itself and the surroundings thereof on the basis of collected sensor data and so forth and autonomously selects and executes various operations according to the situation. The autonomous moving object 11 is characterized, for example, in that, unlike a robot that merely performs an operation according to an instruction made by a user, a suitable operation according to the situation is executed autonomously.

The autonomous moving object 11 can execute, for example, user recognition, substance recognition, and so forth based on a captured image and perform various autonomous behaviors according to the recognized user or substance or the like. Further, the autonomous moving object 11 can also execute, for example, speech recognition based on utterances of the user and perform a behavior based on an instruction made by the user or the like.

Further, the autonomous moving object 11 performs pattern recognition learning in order to acquire the ability for user recognition or substance recognition. At this time, the autonomous moving object 11 not only can perform supervised learning based on given learning data but also can dynamically collect learning data and perform pattern recognition learning relating to a substance or the like on the basis of instructions made by the user or the like.

Further, the autonomous moving object 11 can be trained by the user. Here, the training of the autonomous moving object 11 is defined in a sense broader than general training of, for example, teaching rules and prohibited matters so as to be learned, and signifies that a change the user can feel occurs with the autonomous moving object 11 by involvement of the user in the autonomous moving object 11.

The level of a shape, an ability, a desire, or the like of the autonomous moving object 11 can suitably be designed according to a purpose or a role. For example, the autonomous moving object 11 includes an autonomous moving robot that autonomously moves in a space and executes various operations. In particular, for example, the autonomous moving object 11 includes an autonomous moving robot having a shape and an operation ability that imitate a human being or an animal such as a dog. Further, for example, the autonomous moving object 11 includes a vehicle or some other apparatus having an ability to communicate with the user.

The information processing terminal 12 includes, for example, a smartphone, a tablet terminal, a PC (personal computer), or the like and is used by the user of the autonomous moving object 11. The information processing terminal 12 executes a predetermined application program (hereinafter referred to simply as an application) to implement various functions. For example, the information processing terminal 12 performs communication with the information processing server 13 through the network 21 or performs direct communication with the autonomous moving object 11 to collect various kinds of data relating to the autonomous moving object 11, and presents the collected data to the user or issues an instruction to the autonomous moving object 11.

For example, the information processing server 13 collects various kinds of data from the autonomous moving objects 11 and the information processing terminals 12, provides various kinds of data to the autonomous moving objects 11 and the information processing terminals 12, and controls the operation of the autonomous moving objects 11. Further, for example, the information processing server 13 can also perform pattern recognition learning or a process corresponding to training by the user, as with the autonomous moving objects 11, on the basis of the data collected from the autonomous moving objects 11 and the information processing terminals 12. Further, for example, the information processing server 13 supplies various kinds of data relating to the application described above or to the autonomous moving objects 11 to the information processing terminals 12.

The network 21 includes, for example, some of public networks such as the Internet, a telephone network, or a satellite communication network, various LANs (Local Area Networks) or WANs (Wide Area Networks) including the Ethernet (registered trademark), and so forth. Further, the network 21 may include a dedicated network such as an IP-VPN (Internet Protocol-Virtual Private Network). Further, the network 21 may include wireless communication networks of Wi-Fi (registered trademark), Bluetooth (registered trademark), and so forth.

It is to be noted that the configuration of the information processing system 1 can flexibly be altered according to specifications, use applications, or the like. For example, the autonomous moving object 11 may further perform information communication with various external apparatuses in addition to the information processing terminals 12 and the information processing server 13. The external apparatuses mentioned above can include, for example, servers that transmit information regarding the weather, news, or other services, various home appliances owned by the user, and so forth.

Further, for example, the autonomous moving objects 11 and the information processing terminals 12 need not necessarily have a one-to-one relation and may have, for example, a many-to-many, many-to-one, or one-to-many relation. For example, it is possible for one user to use one information processing terminal 12 to confirm data regarding multiple autonomous moving objects 11 or use multiple information processing terminals to confirm data regarding one autonomous moving object 11.

Example of Hardware Configuration of
Autonomous Moving Object 11

Now, an example of a hardware configuration of the autonomous moving object 11 is described. It is to be noted that the following description is given of a case as an example in which the autonomous moving object 11 is a dog-type quadrupedal walking robot.

Figure 2:
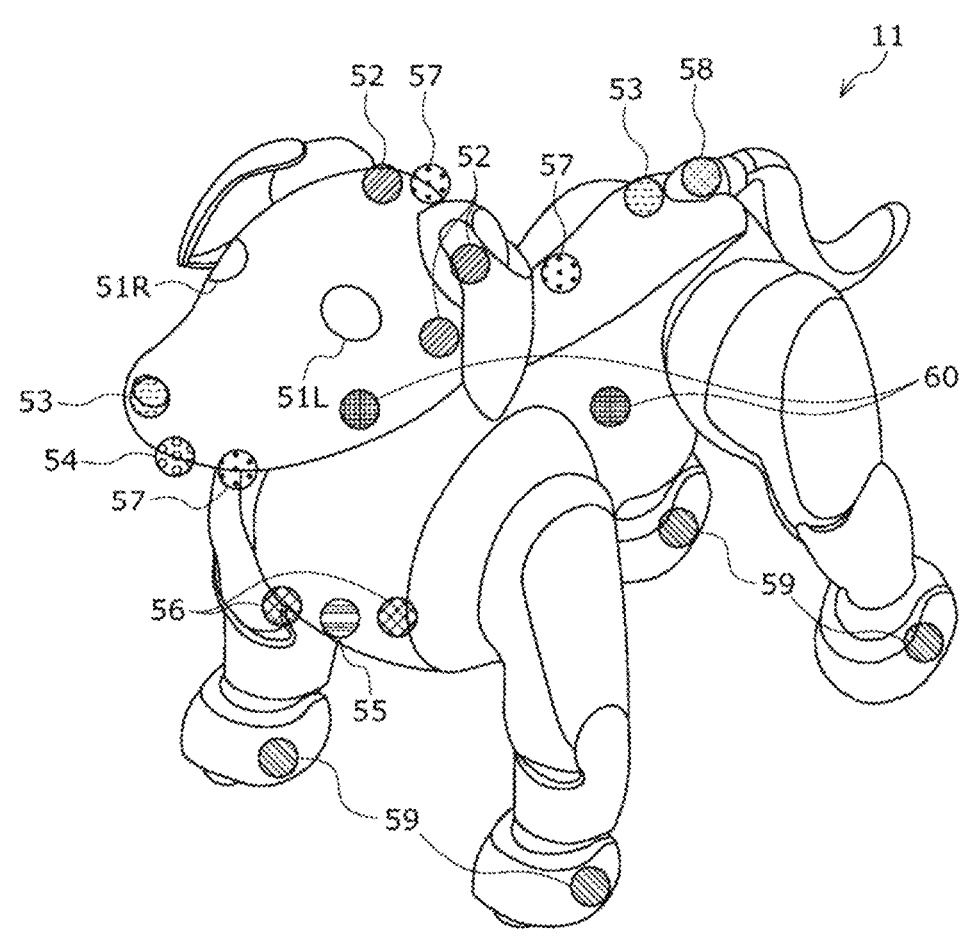
FIG. 2 is a view depicting an example of a hardware configuration of an autonomous moving object.

FIG. 2 is a view depicting the example of the hardware configuration of the autonomous moving object 11. The autonomous moving object 11 is a dog-type quadrupedal walking robot that includes a head, a body, four legs, and a tail.

The autonomous moving object 11 includes a pair of displays 51L and 51R on the head thereof. It is to be noted that, in the following description, in a case where there is no necessity to distinguish the display 51L and the display 51R from each other, each of them is referred to simply as a display 51.

Further, the autonomous moving object 11 includes various sensors. The autonomous moving object 11 includes, for example, microphones 52, cameras 53, a ToF (Time Of Flight) sensor 64, a human sensor 55, distance measurement sensors 56, touch sensors 57, an illuminance sensor 58, sole buttons 59, and inertia sensors 60.

The autonomous moving object 11 includes, for example, four microphones 52 on the head thereof. Each microphone 52 collects ambient sound including, for example, utterances of the user and ambient environmental sound. Further, since the multiple microphones 52 are provided, sound generated in the surroundings can be collected with a high sensitivity, and sound source localization becomes possible.

The autonomous moving object 11 includes, for example, two wide-angle cameras 53 that are provided at the tip of the nose and the waist and capture an image of the surroundings of the autonomous moving object 11. For example, the camera 53 disposed at the tip of the nose performs imaging of a space within a forward field of view of the autonomous moving object 11 (i.e., a field of view of the dog). The camera 53 disposed at the waist performs imaging of the surroundings centered at a space above the autonomous moving object 11. The autonomous moving object 11 can extract feature points of a ceiling and so forth, for example, on the basis of an image captured by the camera 53 disposed at the waist and implement SLAM (Simultaneous Localization and Mapping).

The ToF sensor 54 is provided, for example, at the tip of the nose and detects the distance to a substance existing in front of the head. The autonomous moving object 11 can detect the distance to various substances with a high degree of accuracy with use of the ToF sensor 54 thereof and can implement an operation according to a relative position with respect to a target substance including the user, an obstacle, or the like.

The human sensor 55 is disposed, for example, at the breast and detects the location of the user, a pet kept by the user, or the like. By detecting a moving body existing in front with use of the human sensor 55, the autonomous moving object 11 can implement various operations regarding the moving body, for example, an operation according to an emotion such as an interest, a fear, or a surprise.

The distance measurement sensors 56 are disposed, for example, at the breast and detect a situation of a floor in front of the autonomous moving object 11. The autonomous moving object 11 can detect the distance to a substance existing on the front floor with a high degree of accuracy with use of the distance measurement sensors 56 and can implement an operation according to a relative position with respect to the substance.

The touch sensors 57 are disposed at locations at which the user is highly likely to touch the autonomous moving object 11 such as, for example, the top of the head, a lower portion of the chin, or the back, and detect contact by the user. The touch sensors 57 each include, for example, a touch sensor of the capacitance type or the pressure sensitive type. The autonomous moving object 11 can detect a contact action of the user such as touching, stroking, hitting, or pushing with use of the touch sensors 57 and can perform an operation according to the contact action.

The illuminance sensor 58 is disposed, for example, at the base of the tail on a rear side of the head and detects illuminance of a space in which the autonomous moving object 11 exists. The autonomous moving object 11 can detect ambient brightness with use of the illuminance sensor 58 and execute an operation according to the brightness.

The sole buttons 59 are disposed, for example, at respective portions corresponding to the paws of the four legs and detect whether or not the bottom of each leg of the autonomous moving object 11 is in contact with the floor. The autonomous moving object 11 can detect contact or non-contact with the floor with use of the sole buttons 59 and can recognize, for example, that the autonomous moving object 11 has been picked up by the user.

The inertia sensors 60 are disposed, for example, at the head and the body and detect physical quantities of the speed, acceleration, rotation, and so forth of the head and the body. For example, the inertia sensors 60 each include a six-axis sensor that detects an acceleration and an angular speed based on an X axis, a Y axis, and a Z axis. The autonomous moving object 11 can detect a motion of the head and the body with a high degree of accuracy with use of the inertia sensors 60 and implement operation control according to a situation.

It is to be noted that the arrangement of the sensors provided on the autonomous moving object 11 can flexibly be altered according to specifications, use applications, and so forth. For example, the autonomous moving object 11 may further include, in addition to the arrangement described above, for example, a temperature sensor, a geo-magnetism sensor, various communication devices including GNSS (Global Navigation Satellite System) signal receivers, and so forth.

Figure 3:
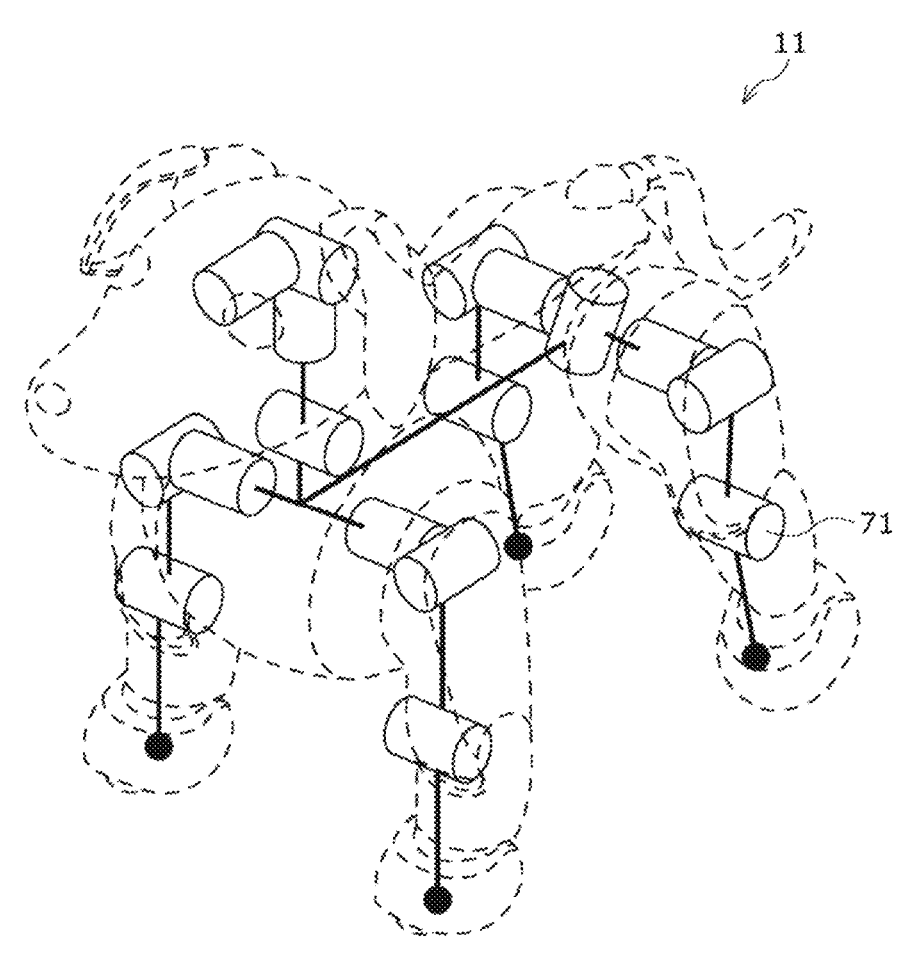
FIG. 3 is a view depicting an example of arrangement of actuators provided in the autonomous moving object.

Now, an example of arrangement of joint portions of the autonomous moving object 11 is described with reference to FIG. 3. FIG. 3 depicts an example of arrangement of actuators 71 provided in the autonomous moving object 11. The autonomous moving object 11 has a total of 22 degrees of rotation freedom including, in addition to those at rotation points depicted in FIG. 3, two at the ears, two at the tail, and one at the mouth.

For example, since the autonomous moving object 11 has three degrees of freedom at the head, it can perform both a nodding operation and a head tilting operation. Further, the autonomous moving object 11 can reproduce a swing operation of the waist with use of the actuator 71 provided at the waist, thereby implementing a natural and flexible operation more resembling that of an actual dog.

It is to be noted that the autonomous moving object 11 may implement the 22 degrees of rotation freedom, for example, by combining one-axis actuators and two-axis actuators. For example, for the elbow or knee portions of the legs, one-axis actuators may be adopted, and for the shoulders and the bases of the thighs, two-axis actuators may be adopted.

Now, a function of the displays 51 provided in the autonomous moving object 11 is described with reference to FIGS. 4A, 4B, and 4C.

The autonomous moving object 11 includes two displays 51R and 51L corresponding to the right eye and the left eye, respectively. Each display 51 has a function for visually representing a movement of the eye or an emotion of the autonomous moving object 11. For example, each display 51 can represent an operation of an eyeball, a pupil, and an eyelid according to an emotion or an operation to produce a natural operation resembling that of an existing animal such as a dog and represent a line of sight or an emotion of the autonomous moving object 11 with a high degree of accuracy and flexibly. Further, the user can intuitively recognize a state of the autonomous moving object 11 from the operation of the eyeballs displayed on the displays 51.

Further, the displays 51 are implemented, for example, from two respective OLEDs (Organic Light Emitting Diodes) independent of each other. The use of the OLEDs makes it possible to reproduce a curved face of the eyeball. As a result, a more natural exterior can be implemented in comparison with that in a case in which a pair of eyeballs are represented from a single planar display or another case in which two eyeballs are represented by two respective planar displays independent of each other.

Figures 5A, 5B:
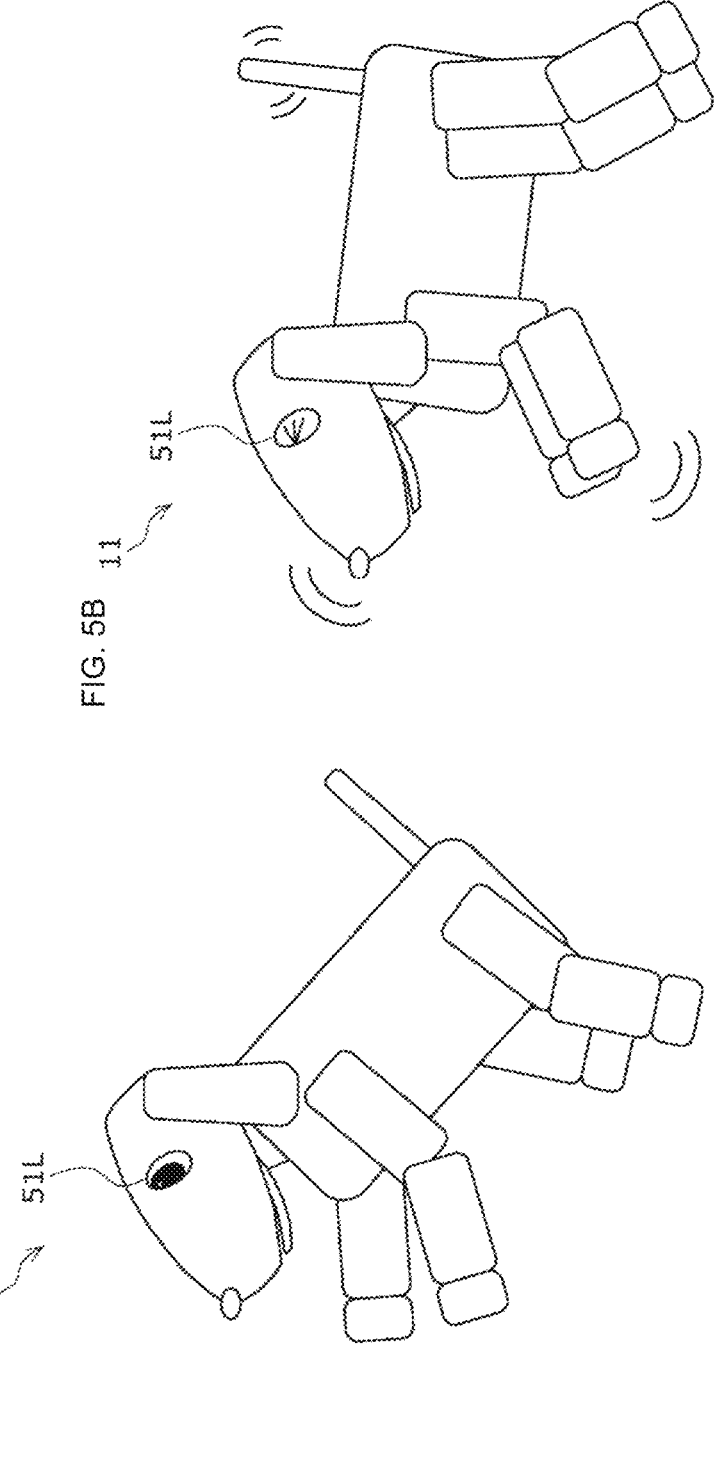
FIGS. 5A and 5B are views depicting examples of an operation of the autonomous moving object.

With the configuration described above, the autonomous moving object 11 can reproduce an operation and an emotional expression more resembling those of an existing creature, by controlling the operation of the joint portions and the eyeballs with a high degree of accuracy and flexibly as depicted in FIGS. 5A and 5B.

It is to be noted that, although FIGS. 5A and 5B are views depicting examples of the operation of the autonomous moving object 11, an external structure of the autonomous moving object 11 is depicted in a simplified form in FIGS. 5A and 5B in order that description is given focusing on the operation of the joint portions and the eyeballs of the autonomous moving object 11.

Now, an example of a configuration of a light emission section of the exterior of the autonomous moving object 11 is described.

On a surface of the exterior of the autonomous moving object 11, multiple light emitting devices are disposed in a complex curved surface fashion according to the shape of the exterior. The light emitting devices may be disposed in such a manner as to cover the overall surface of the exterior of the autonomous moving object 11 or may be disposed in such a manner as to cover part of the surface of the exterior of the autonomous moving object 11.

Each light emitting device includes, for example, an LED (Light Emitting Diode) whose color and brightness (luminosity) can freely be controlled (whose color and brightness are variable), and changes the color and brightness of the surface of the exterior of the autonomous moving object 11. On the surface of the LED constituting the light emitting device, a reflection substance (for example, silicon or the like) for diffusing light is sometimes disposed.

FIGS. 6 to 8 depict examples of an area in which a light emitting device is disposed on the surface of the exterior of the autonomous moving object 11 (the area is hereinafter referred to as a light emitting area).

The light emitting area is disposed, for example, around a movable portion such as a joint portion of the autonomous moving object 11. For example, as depicted in FIG. 6, a light emitting area A1 is disposed at a top portion of the head of the autonomous moving object 11. For example, a crown is represented by the light emitting area A1. A light emitting area A2L is disposed, for example, on the surface of the left ear of the autonomous moving object 11. A light emitting area A2R is disposed, for example, on the surface of the right ear of the autonomous moving object 11.

For example, as depicted in FIG. 7, a light emitting area A3 is disposed around the neck of the autonomous moving object 11. For example, a collar is represented by the light emitting area A3.

As depicted in FIG. 8, a V-shaped light emitting area A4 is disposed, for example, on the breast of the autonomous moving object 11. A light emitting area A5L is disposed, for example, on the thigh of the front left leg of the autonomous moving object 11. A light emitting area A5R is disposed, for example, on the thigh of the front right leg of the autonomous moving object 11.

It is to be noted that, though not depicted, for example, other light emitting areas are disposed on the abdomen, the back, the rear left leg, the rear right leg, the tail, and so forth.

Example of Functional Configuration of Autonomous Moving Object 11

Now, an example of a functional configuration of the autonomous moving object 11 is described with reference to FIG. 9. The autonomous moving object 11 includes a contact information acquisition section 101, a movement information acquisition section 102, an information processing section 103, a driving section 104, a light emission section 105, a sound outputting section 106, and a display section 107.

The contact information acquisition section 101 includes, for example, the touch sensors 57 of FIG. 2 and acquires information relating to a contact action performed on the autonomous moving object 11 (hereinafter referred to as contact information). The contact information includes sensor data outputted, for example, from the touch sensors 57. The contact information acquisition section 101 supplies the acquired contact information to the information processing section 103.

The movement information acquisition section 102 includes, for example, the sole buttons 59 and the inertia sensors 60 of FIG. 2 and acquires movement information relating to a movement of the autonomous moving object 11. The movement information includes, for example, sensor data outputted from the sole buttons 59 and the inertia sensors 60 and control data outputted from the actuators 71 of FIG. 3. The control data of the actuators 71 includes, for example, data regarding a rotation direction, a rotation speed, a rotation angle, and so forth. The movement information acquisition section 102 supplies the acquired movement information to the information processing section 103.

The information processing section 103 includes a contact information processing section 121, a movement information processing section 122, a motion data retention section 123, a motion controlling section 124, a driving controlling section 125, a light emission controlling section 126, a sound output controlling section 127, and a display controlling section 128.

The contact information processing section 121 performs processing of contact information supplied from the contact information acquisition section 101 to detect a contact action performed on the autonomous moving object 11. For example, the contact information processing section 121 detects a contacted position and a type, a strength, a movement, and so forth of the contact action. The contact information processing section 121 supplies information indicative of a result of the detection of the contact action performed on the autonomous moving object 11 to the motion controlling section 124.

The movement information processing section 122 performs processing of movement information supplied from the movement information acquisition section 102 to detect a movement of the autonomous moving object 11. For example, the movement information processing section 122 detects a position, an angle, a movement, and so forth of a movable portion such as a joint portion of the autonomous moving object 11. The movement information processing section 122 supplies information indicative of a result of the detection of the movement of the autonomous moving object 11 to the motion controlling section 124.

The motion data retention section 123 retains motion data relating to various motions of the autonomous moving object 11. The motion data includes, for example, driving data, light emission data, sound data, and display data.

For example, motion data A(t) corresponding to a motion A includes time-series pieces of motion data A(0), A(1), . . . , A(tend) obtained at predetermined time intervals (for example, 10 ms).

The motion data A(0) includes m pieces of driving data (a1(0), a2(0), . . . , am(0)), n pieces of light emission data (b1(0), b2(0), . . . , bn(0)), one piece of sound data (c(0)), and two pieces of display data (d1(0), d2(0)). The m pieces of driving data are used, for example, for control of the actuators 71. The n pieces of light emission data are used, for example, for control of the light emitting devices. The one piece of sound data is used for control of outputting of sound. The two pieces of display data are used, for example, for control of the displays 51L and 51R.

Similarly, the motion data A(1) includes m pieces of driving data (a1(1), a2(1), . . . , am(1)), n pieces of light emission data (b1(1), b2(1), . . . , bn(1)), one piece of sound data (c(1)), and two pieces of display data (d1(1), d2(1)).

Similarly, the motion data A(tend) includes m pieces of driving data (a1(tend), a2(tend), . . . , am(tend)), n pieces of light emission data (b1(tend), b2(tend), . . . , bn(tend)), one piece of sound data (c(tend)), and two pieces of display data (d1(tend), d2(tend)).

Similarly, for example, the motion data B(t) corresponding to a motion B includes time-series pieces of motion data B(0), B(1), . . . , B(tend) obtained at predetermined time intervals (for example, 10 ms).

It is to be noted that the value of tend, i.e., the number of pieces of motion data, differs for each motion. Further, the duration of a motion is set by the number of pieces of motion data.

The motion controlling section 124 performs control of various motions of the autonomous moving object 11 on the basis of the state of the autonomous moving object 11. For example, the motion controlling section 124 selects a motion to be executed by the autonomous moving object 11, on the basis of a contact action performed on the autonomous moving object 11, a movement of the autonomous moving object 11, and so forth. The motion controlling section 124 acquires motion data for implementing the selected motion, from the motion data retention section 123. Further, the motion controlling section 124 generates motion data for implementing the selected motion as occasion demands.

The motion controlling section 124 implements various motions of the autonomous moving object 11 on the basis of acquired or generated motion data. For example, the motion controlling section 124 supplies driving data from among the motion data to the driving controlling section 125, light emission data to the light emission controlling section 126, sound data to the sound output controlling section 127, and display data to the display controlling section 128. Consequently, the motion controlling section 124 controls the movement, light emission pattern, sound output, and facial expression of the autonomous moving object 11. Further, the motion controlling section 124 controls timings for supplying the respective pieces of data, to thereby associate two or more of the movement, light emission pattern, sound output, and facial expression of the autonomous moving object 11 with one another.

In the following description, a surface representation implemented by associating multiple different elements (movement, light emission pattern, sound output, and facial expression) of the autonomous moving object 11 with one another is referred to as a digital motion representation.

The driving controlling section 125 controls the movement of the autonomous moving object 11 by controlling the driving section 104 on the basis of driving data.

The light emission controlling section 126 controls the light emission pattern that is a pattern of the color and brightness of the light emission section 105 on the basis of light emission data. By the control, for example, the color and brightness of the light emission areas described above are controlled, thereby controlling the light emission representation of the autonomous moving object 11.

The sound output controlling section 127 controls the sound outputting section 106 on the basis of sound data to control the sound output of the autonomous moving object 11. By the control, for example, the sound representation by music, cries, sound effects, and so forth is controlled.

The display controlling section 128 performs control of the display section 107 on the basis of display data to control the facial expression of the autonomous moving object 11.

The driving section 104 includes, for example, the actuators 71 of FIG. 3. The driving section 104 implements a movement of a joint portion or the like of the autonomous moving object 11.

The light emission section 105 includes, for example, the light emitting devices described hereinabove. The light emission section 105 implements a light emission representation of the autonomous moving object 11 by changing the light emission pattern, in other words, by changing the color and brightness of the surface of the autonomous moving object 11. For example, the light emission section 105 uses light to emphasize a movement of the autonomous moving object 11 or represent a design of a costume, a coat of hair, or the like.

The sound outputting section 106 includes, for example, a sound generation device, a speaker, or the like. The sound outputting section 106 outputs music, cries, sound effects, and so forth to implement a sound representation of the autonomous moving object 11.

The display section 107 includes, for example, the display 51L and the display 51R of FIG. 2. The display section 107 moves the eyes of the autonomous moving object 11 to change the facial expression, thereby implementing a visual emotional expression of the autonomous moving object 11.

Process of Autonomous Moving Object 11

Now, processes of the autonomous moving object 11 are described with reference to FIGS. 10, 11, 12, 13, 14, 15, 16, 17A, 17B, 17C, and 17D.

"Jiggle" Execution Process

First, a "jiggle" execution process executed by the autonomous moving object 11 is described with reference to a flow chart of FIG. 10. The term "jiggle" is an operation of the autonomous moving object 11 when it shakes its body, for example.

This process is started, for example, when a condition under which the autonomous moving object 11 is to execute "jiggle" is satisfied.

Figure 11:
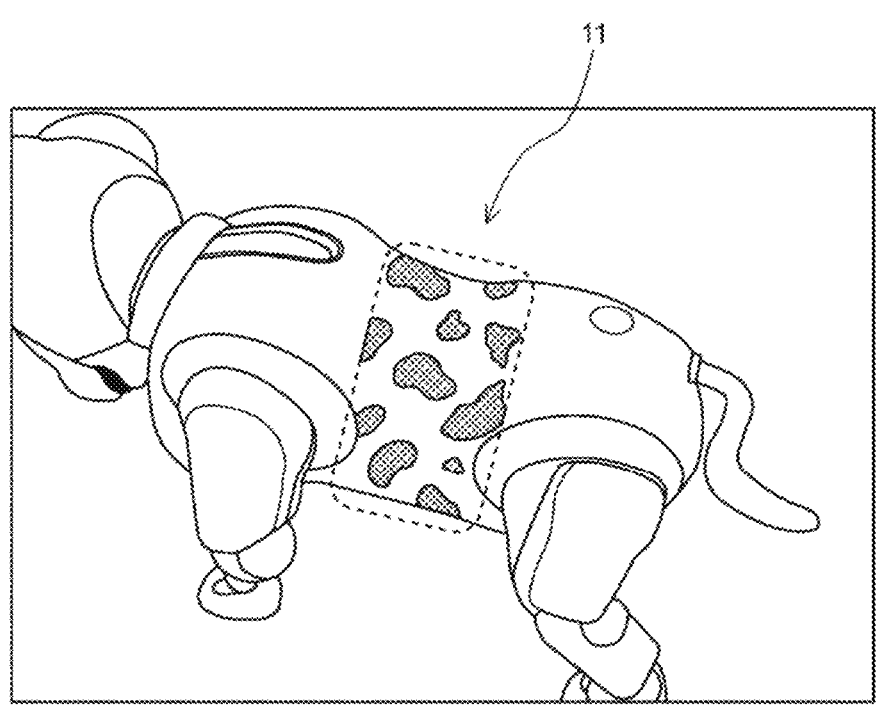
FIG. 11 is a view depicting an example of a light emission pattern of a coat of hair of the autonomous moving object.

Further, prior to this process, the light emission section 105 on the body or the like of the autonomous moving object 11 is set to a light emission pattern representative of a coat of hair, for example, as depicted in FIG. 11.

In step S1, the motion controlling section 124 sets an execution motion to "jiggle."

In step S2, the motion controlling section 124 sets a time variable t to 0.

In step S3, the motion controlling section 124 acquires motion data of "jiggle" at time t from the motion data retention section 123.

In step S4, the autonomous moving object 11 performs a digital motion representation on the basis of the motion data.

In particular, the motion controlling section 124 extracts driving data from the motion data acquired by the process in step S3 and supplies the driving data to the driving controlling section 125. The driving controlling section 125 controls the driving section 104 on the basis of the driving data.

The motion controlling section 124 extracts light emission data from the motion data acquired by the process in step S3 and supplies the light emission data to the light emission controlling section 126. The light emission controlling section 126 controls the light emission section 105 on the basis of the light emission data.

The motion controlling section 124 extracts sound data from the motion data acquired by the process in step S3 and supplies the sound data to the sound output controlling section 127. The sound output controlling section 127 controls the sound outputting section 106 on the basis of the sound data.

The motion controlling section 124 extracts display data from the motion data acquired by the process in step S3 and supplies the display data to the display controlling section 128. The display controlling section 128 controls the display section 107 on the basis of the display data.

In step S5, the motion controlling section 124 decides whether or not the motion has ended. In a case where the value of the time variable t has not reached tend indicative of a tail end of the motion data, the motion controlling section 124 decides that the motion has not ended, and the processing advances to step S6.

In step S6, the motion controlling section 124 increments the value of the time variable t by 1.

Thereafter, the processing returns to step S3, and the processes from step S3 to step S6 are executed repeatedly until after it is decided in step S5 that the motion has ended.

The processes described above are repeated to execute the digital motion representation corresponding to the jiggle. For example, as the autonomous moving object 11 shakes the body, the light emission pattern of the light emission section 105 changes in such a manner that the coat of hair looks trembling. For example, as the autonomous moving object 11 shakes the body, such a sound effect as trembling sound is outputted. For example, as the autonomous moving object 11 shakes the body, the facial expression of the autonomous moving object 11 changes.

Since the jiggle movement of the autonomous moving object 11 is emphasized in this manner, the ability in expression of the autonomous moving object 11 is enhanced. Consequently, an impression of the movement of the autonomous moving object 11 given to the user is strengthened, and the degree of satisfaction of the user increases.

On the other hand, in step S5, in a case where the value of the time variable t has reached tend, the motion controlling section 124 decides that the motion has ended, and ends the "jiggle" execution process.

It is to be noted that, along with the end of the jiggle, for example, the light emission section 105 restores the light emission pattern representative of the coat of hair represented before the execution of the jiggle.

"Quadrupedal Walking" Execution Process

Now, a "quadrupedal walking" execution process executed by the autonomous moving object 11 is described with reference to a flow chart of FIG. 12.

This process is started, for example, when a condition under which the autonomous moving object 11 is to execute "quadrupedal walking" is satisfied.

Figure 13:
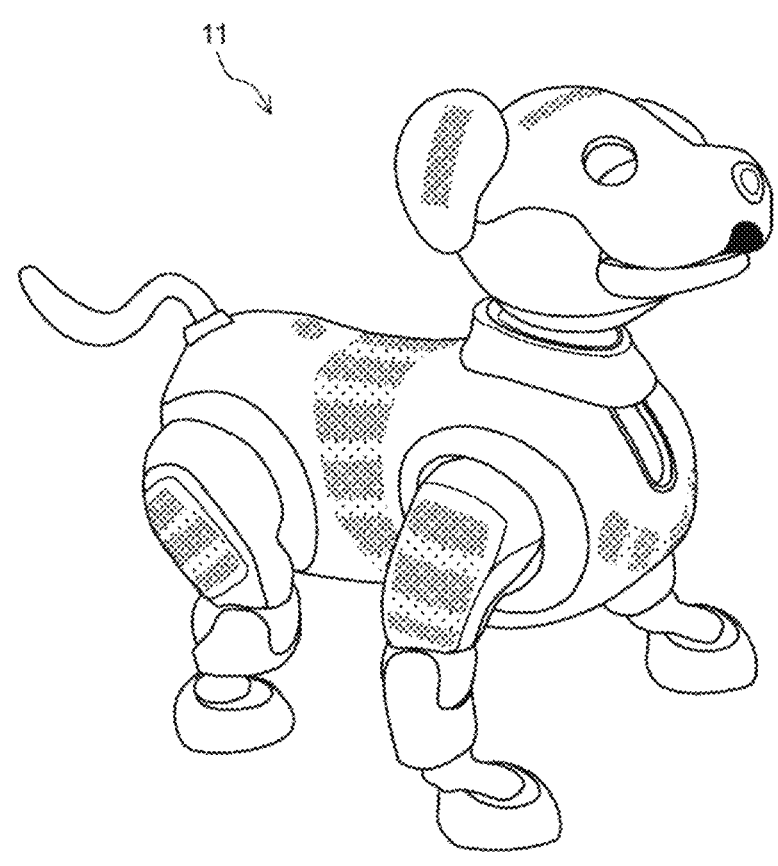
FIG. 13 is a view depicting an example of a light emission pattern of a costume of the autonomous moving object.

Further, prior to this process, the light emission section 105 on the body and so forth of the autonomous moving object 11 is set to a light emission pattern representative of a coat of hair, for example, as depicted in FIG. 11 described hereinabove. Alternatively, for example, as depicted in FIG. 13, the light emission section 105 on the head, body, legs, and so forth of the autonomous moving object 11 is set to a light emission pattern representative of a costume.

In step S51, the motion controlling section 124 sets the execution motion to "quadrupedal walking."

In step S52, the motion controlling section 124 sets the time variable t to 0.

In step S53, the motion controlling section 124 acquires motion data of "quadrupedal walking" at time t from the motion data retention section 123.

Figure 10:
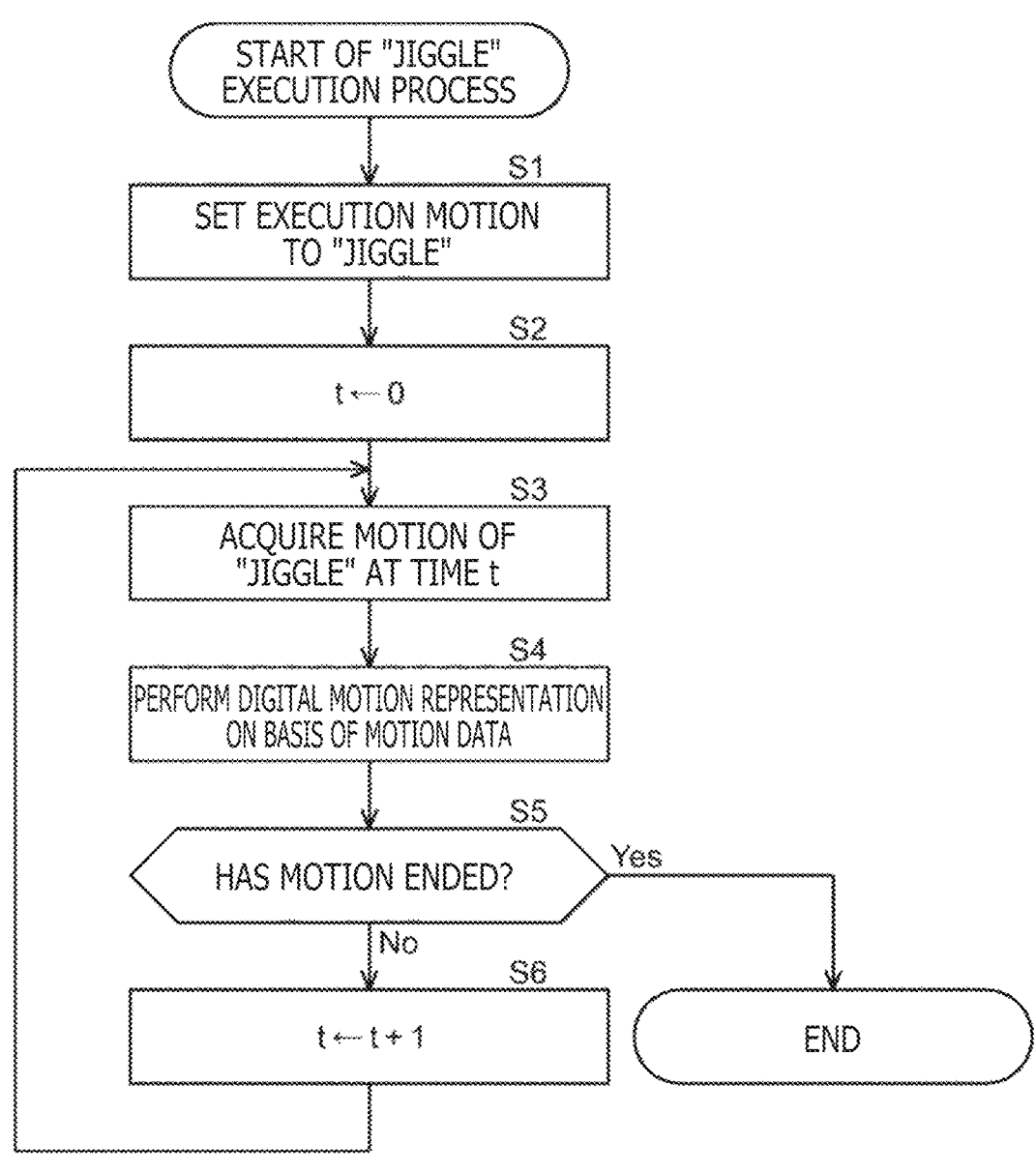
FIG. 10 is a flow chart illustrating a "jiggle" execution process.

In step S54, a digital motion representation is performed on the basis of the motion data as with the process in step S4 of FIG. 10.

In step S55, the autonomous moving object 11 detects a movement of a joint portion. In particular, the movement information acquisition section 102 acquires movement information relating to a movement of the autonomous moving object 11 from the sole buttons 59, the inertia sensors 60, and the actuators 71. The movement information acquisition section 102 supplies the acquired movement information to the movement information processing section 122.

The movement information processing section 122 detects a movement of a joint portion of the autonomous moving object 11 on the basis of the movement information. The movement information processing section 122 supplies information indicative of the detected movement of the joint portion to the motion controlling section 124.

In step S56, the motion controlling section 124 generates light emission data associated with the movement. The motion controlling section 124 supplies the generated light emission data to the light emission controlling section 126.

In step S57, the light emission controlling section 126 performs light emission control on the basis of the light emission data. In particular, the light emission controlling section 126 controls the light emission pattern of the light emission section 105 on the basis of the light emission data.

In step S58, it is decided whether or not the motion has ended, as with the process in step S5 of FIG. 10. In a case where it is decided that the motion has not ended, the processing advances to step S59.

In step S59, the motion controlling section 124 increments the value of the time variable t by 1.

Thereafter, the processing returns to step S53, and the processes in step S53 to step S59 are executed repeatedly until after it is decided in step S58 that the motion has ended.

The processes described are repeated to execute the digital motion representation corresponding to quadrupedal walking.

For example, the light emission pattern of the light emission section 105 changes in association with a movement of a leg of the autonomous moving object 11.

Figure 14:
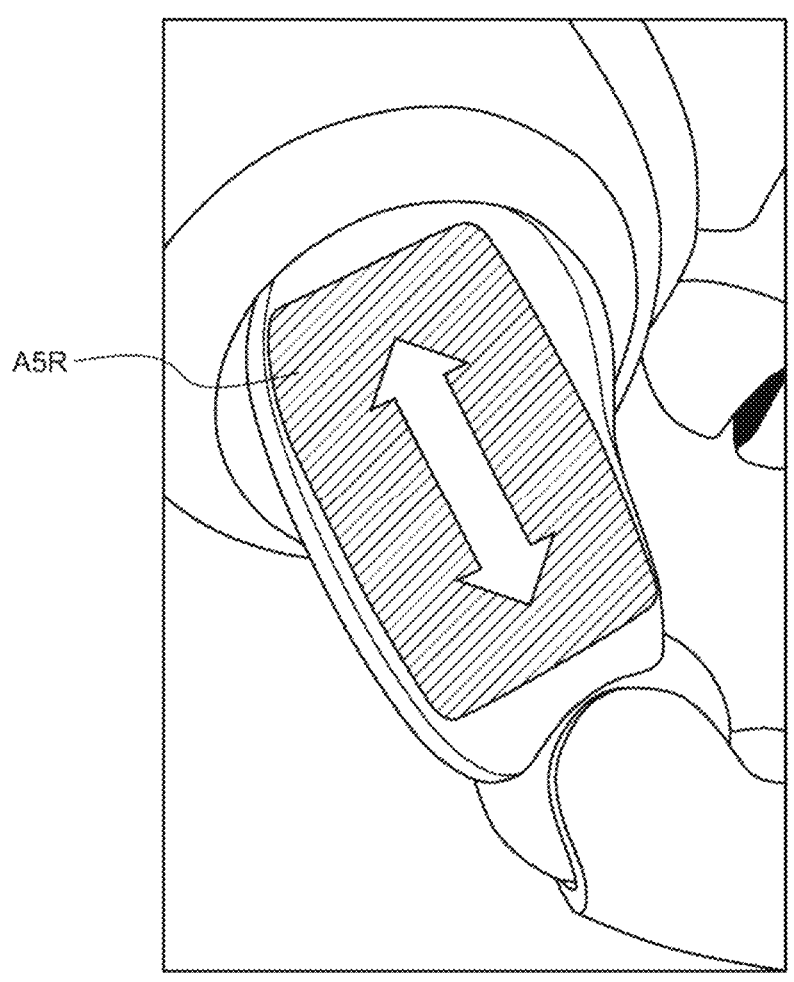
FIG. 14 is a view illustrating a change in light emission pattern of a light emission area of a right leg upon walking.

In particular, for example, as schematically depicted in FIG. 14, a direction in which a leg of the autonomous moving object 11 moves and a direction in which the light emission pattern on the leg changes are associated with each other. In particular, for example, as indicated by an arrow mark of FIG. 14, a lighted portion of the light emitting area A5R on the right front leg moves upward as the autonomous moving object 11 raises the right front leg. For example, as indicated by the arrow mark of FIG. 14, the lighted portion of the light emitting area A5R on the right front leg moves downward as the autonomous moving object 11 lowers the right front leg. It is to be noted that, though not depicted, also the lighted portion of the light emitting area on the other legs similarly moves upward or downward according to a timing of raising or lowering of the leg.

For example, to match a timing at which each leg is landed, the light emitting area of the landed leg changes. In particular, for example, when each leg is landed, the light emitting area of the landed leg is brightened first and then returns to its initial state.

For example, a speed of walking of the autonomous moving object 11 and a speed of change of the light emission pattern of the light emitting area of each leg are associated with each other. For example, as walking becomes faster, the change of the light emission pattern becomes more drastic (becomes faster), and as walking becomes slower, the change of the light emission pattern is moderated (becomes slower).

For example, a timing at which the autonomous moving object starts walking and a timing at which the autonomous body stops walking are synchronized with timings at which a change of the light emission pattern of the light emitting area of each leg starts and ends, respectively. For example, immediately before the autonomous moving object 11 starts walking, the light emission area of each leg emits light in a light emission pattern that prompts imagination of a preliminary action of straining the muscle. For example, when the autonomous moving object 11 is to stop, the light emission area of each leg emits light in a light emission pattern of such a representation that the autonomous moving object 11 trembles as if it is braking.

Further, for example, operation sound representative of a movement of a leg is outputted in association with a movement of a leg of the autonomous moving object 11.

Since the walking operation of the autonomous moving object 11 is emphasized in this manner, the ability in expression of the autonomous moving object 11 increases. Consequently, an impression of the walking operation of the autonomous moving object 11 given to the user is strengthened, and the degree of satisfaction of the user increases.

On the other hand, in a case where it is decided in step S58 that the motion has ended, the "quadrupedal walking" execution process is ended.

It is to be noted that, also in a case where the autonomous moving object 11 runs, a digital motion representation is executed by a process similar to that in the case where the autonomous moving object 11 walks.

"Samba Dance" Execution Process

Figure 15:
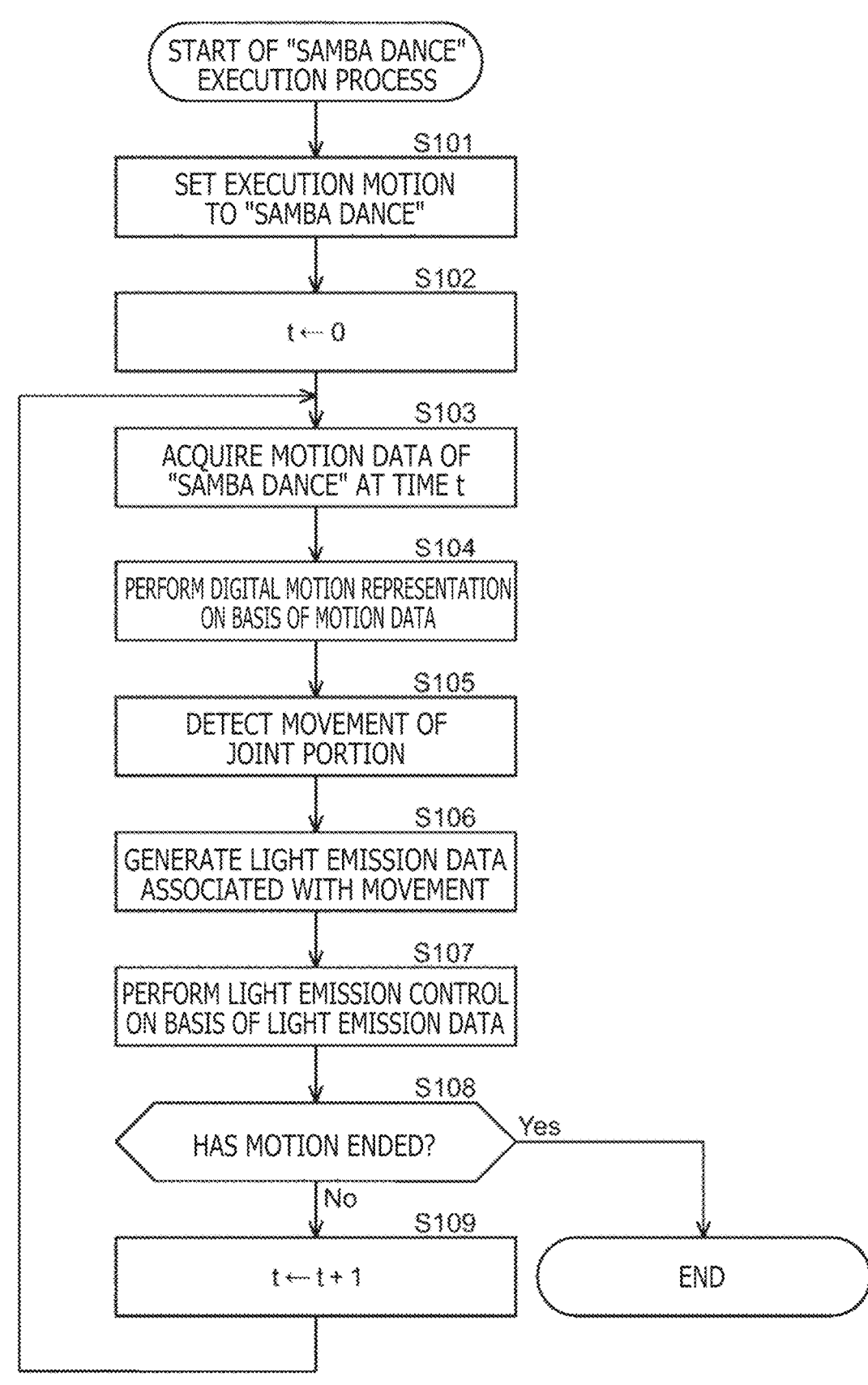
FIG. 15 is a flow chart illustrating a "samba dance" execution process.

Now, a "samba dance" execution process executed by the autonomous moving object 11 is described with reference to a flow chart of FIG. 15.

This process is started, for example, when a condition under which the autonomous moving object 11 is to execute "samba dance" is satisfied.

Further, prior to this process, on the head, body, legs, and so forth of the autonomous moving object 11, the light emission section 105 is set, for example, to a light emission pattern representative of a costume as depicted in FIG. 13 described hereinabove. It is to be noted that, for example, in addition to the costume represented by the light emission pattern, a costume that prompts imagination of samba may be put on the autonomous moving object 11.

In step S101, the motion controlling section 124 sets the execution motion to "samba dance."

In step S102, the motion controlling section 124 sets the time variable t to 0.

In step S103, the motion controlling section 124 acquires motion data of "samba dance" at time t from the motion data retention section 123.

In step S104, a digital motion representation is performed on the basis of the motion data as with the process in step S4 of FIG. 10.

Figure 12:
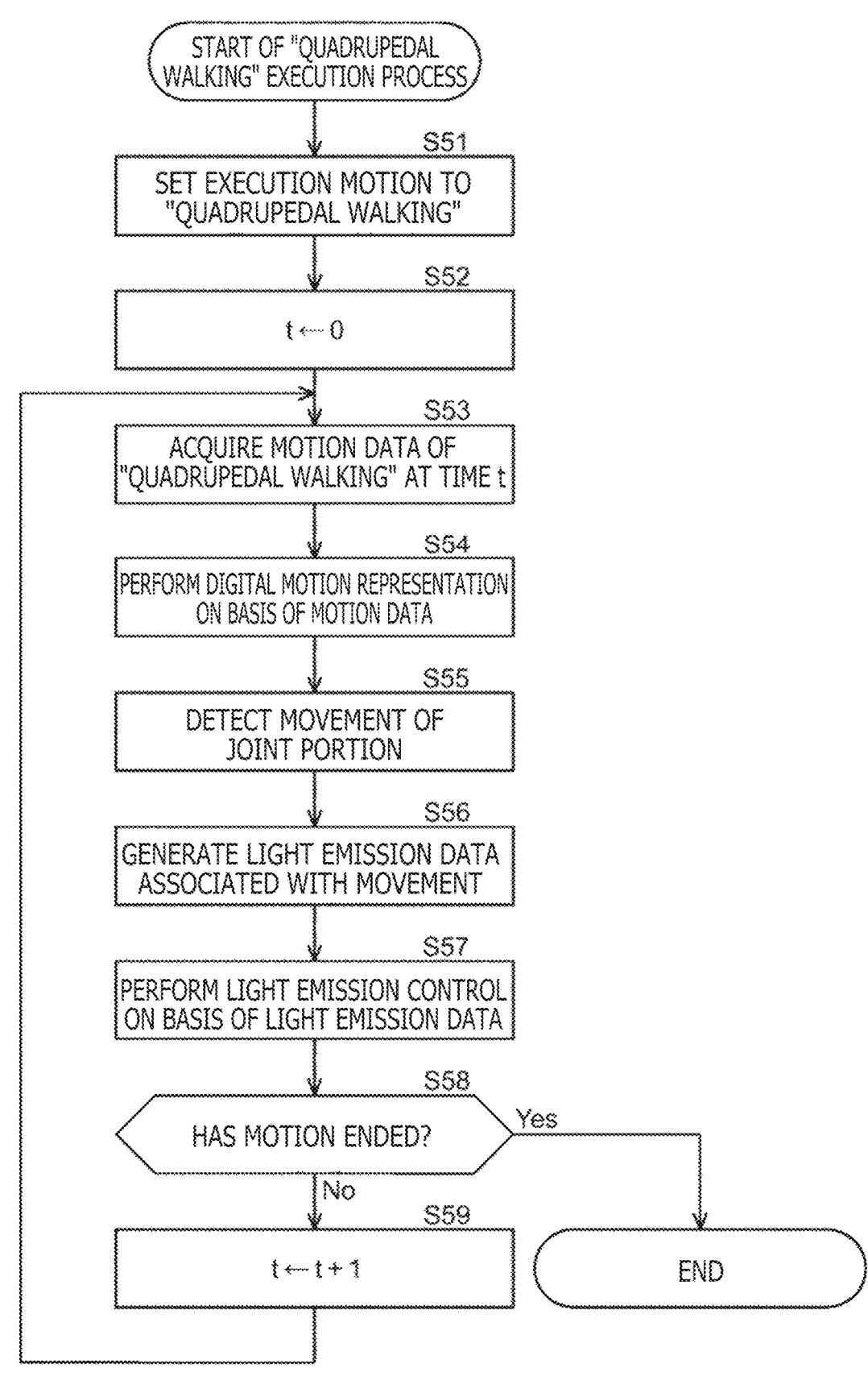
FIG. 12 is a flow chart illustrating a "quadrupedal walking" execution process.

In step S105, a movement of a joint portion is detected as with the process in step S55 of FIG. 12.

In step S106, light emission data in association with the movement is generated as with the process in step S56 of FIG. 12.

In step S107, light emission control is performed on the basis of the light emission data as with the process in step S57 of FIG. 12.

In step S108, it is decided whether or not the motion has ended, as with the process in step S5 of FIG. 10. In a case where it is decided that the motion has not ended, the processing advances to step S109.

In step S109, the motion controlling section 124 increments the time variable t by 1.

Thereafter, the processing returns to step S103, and the processes in step S103 to step S109 are executed repeatedly until after it is decided in step S108 that the motion has ended.

Since the processes described above are repeated, the digital motion representation corresponding to the samba dance is executed. For example, the autonomous moving object 11 outputs music of samba and dances to the music. More particularly, for example, the autonomous moving object 11 sways the body to the rhythm of samba. For example, the light emission pattern changes in such a manner that the costume rhythmically changes according to the sway of the body of the autonomous moving object 11.

Further, the light emission pattern of the light emission area of each leg changes according to subtle movements of the leg. For example, the number of light emitting devices that emit light, the intensity of light, and the color of light change.

It is to be noted that, for example, in a case where the autonomous moving object 11 wears a costume, the light emission section 105 may change the color or brightness of the light that illuminates the costume, in association with a movement or the like of the autonomous moving object 11. Further, for example, in a case where the costume has a light emission section, the light emission controlling section 126 may change the color or brightness of the costume in association with a movement or the like of the autonomous moving object 11.

In this manner, the performance of the samba dance of the autonomous moving object 11 becomes gorgeous, and the ability in expression of the autonomous moving object 11 improves. Consequently, an impression of a movement of the autonomous moving object 11 given to the user is strengthened, and the degree of satisfaction of the user increases.

On the other hand, in a case where it is decided in step S108 that the motion has ended, the "samba dance" execution process is ended.

It is to be noted that, along with the end of the samba dance, for example, the light emission section 105 restores the light emission pattern representative of the costume represented before the execution of the samba dance.

"Relaxation" Execution Process

Now, a "relaxation" execution process executed by the autonomous moving object 11 is described with reference to a flow chart of FIG. 16.

This process is started, for example, when a condition under which the autonomous moving object 11 is to execute "relaxation" is satisfied.

Further, prior to this process, the light emission section 105 on the body and so forth of the autonomous moving object 11 is set to a light emission pattern representative of a coat of hair, for example, as depicted in FIG. 11 described hereinabove.

In step S151, the motion controlling section 124 sets the execution motion to "relaxation."

In step S152, the motion controlling section 124 sets the time variable t to 0.

In step S153, the motion controlling section 124 acquires motion data of "relaxation" at time t from the motion data retention section 123.

In step S154, a digital motion representation is performed on the basis of the motion data as with the process in step S4 of FIG. 10.

In step S155, the contact information acquisition section 101 acquires contact information. In particular, the contact information acquisition section 101 acquires contact information relating to a contact action performed on the autonomous moving object 11, from the touch sensors 57. The contact information acquisition section 101 supplies the acquired contact information to the contact information processing section 121.

In step S156, the contact information processing section 121 decides, on the basis of the contact information, whether or not the autonomous moving object 11 is being stroked. In a case where it is decided that the autonomous moving object 11 is being stroked, the processing advances to step S157.

In step S157, the contact information processing section 121 detects a stroking way on the basis of the contact information. For example, the contact information processing section 121 detects a direction in which the autonomous moving object 11 is being stroked. More particularly, for example, the contact information processing section 121 detects whether the autonomous moving object 11 is being stroked in a direction same as the direction of the coat of hair or in a direction opposite to the direction of the coat of hair.

Further, for example, the contact information processing section 121 detects the strength of the stroking. More particularly, for example, the contact information processing section 121 detects whether the autonomous moving object 11 is being stroked gently or is being stroked hard. The contact information processing section 121 supplies information indicative of a result of the detection of the stroking way to the motion controlling section 124.

In step S158, the motion controlling section 124 generates motion data corresponding to the stroking way.

For example, the motion controlling section 124 generates motion data on the basis of the relation between the direction of the coat of hair and the direction in which the autonomous moving object 11 is being stroked, the strength with which the autonomous moving object 11 is being stroked, and so forth.

Figures 17A, 17B, 17C, 17D:
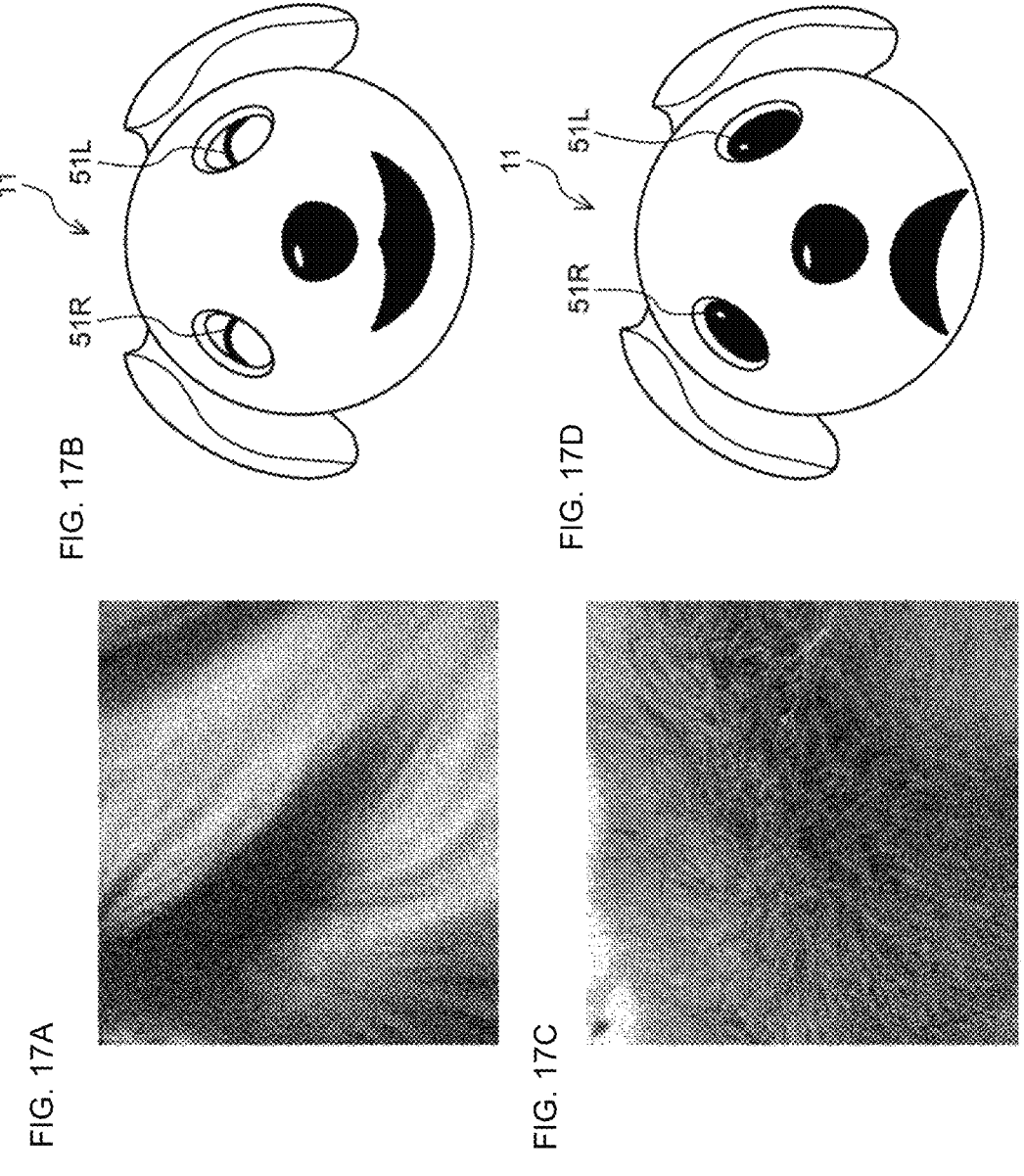
FIGS. 17A, 17B, 17C, and 17D are views illustrating a change in coat of hair and facial expression in a case where the autonomous moving object is stroked.

In particular, for example, in a case where the autonomous moving object 11 is being stroked gently at a predetermined portion (for example, the back) thereof in the direction same as the direction of the coat of hair, the motion controlling section 124 generates light emission data indicative of a light emission pattern that imitates a manner in which the coat of hair is straightened as depicted in FIG. 17A. Further, for example, the motion controlling section 124 generates sound data that imitates a cry indicative of a joyful emotion. Further, for example, the motion controlling section 124 generates display data that imitates a facial expression indicating a joyful emotion as indicated in FIG. 17B.

On the other hand, for example, in a case where the autonomous moving object 11 is being stroked hard at a predetermined portion (for example, the back) thereof in the direction opposite to the direction of the coat of hair, for example, the motion controlling section 124 generates light emission data indicative of a light emission pattern that imitates a manner in which the coat of hair is disheveled as depicted in FIG. 17C. Further, for example, the motion controlling section 124 generates sound data that imitates a cry indicative of an unpleasant emotion. Further, for example, the motion controlling section 124 generates display data that imitates a facial expression indicative of an unpleasant emotion as depicted in FIG. 17D.

The motion controlling section 124 supplies the generated light emission data to the light emission controlling section 126, supplies the generated sound data to the sound output controlling section 127, and supplies the generated display data to the display controlling section 128.

In step S159, a digital motion representation is performed on the basis of the motion data as with the process in step S4 of FIG. 10.

Thereafter, the processing advances to step S160.

On the other hand, in a case where it is decided in step S156 that the autonomous moving object 11 is not being stroked, the processes in step S157 to step S159 are skipped, and the processing advances to step S160.

In step S160, it is decided whether or not the motion has ended, as with the process in step S5 of FIG. 10. In a case where it is decided that the motion has not ended, the processing advances to step S161.

In step S161, the motion controlling section 124 increments the value of the time variable t by 1.

Thereafter, the processing returns to step S153, and the processes in step S153 to step S160 are executed repeatedly until after it is decided in step S160 that the motion has ended.

The processes described above are repeated to execute the digital motion representation indicative of a reaction to the stroking action of the user. For example, before the user strokes, the light emission pattern changes in such a manner that the coat of hair flutters naturally. Then, for example, when the user strokes a predetermined portion (for example, the back) of the autonomous moving object 11 gently in the direction same as the direction of the coat of hair, the light emission pattern changes in such a manner that the coat of hair is straightened. Further, the autonomous moving object 11 makes a joyful facial expression or emits a joyful cry.

On the other hand, for example, when the user strongly strokes a predetermined portion (for example, the back) of the autonomous moving object 11 in the direction opposite to the direction of the coat of hair, the light emission pattern changes in such a manner that the coat of hair is disheveled. Further, the autonomous moving object 11 makes an unpleasant facial expression or emits an unpleasant cry.

In this manner, the ability in expression of the autonomous moving object 11 in response to a stroking action of the user is enhanced, and the degree of satisfaction of the user increases.

On the other hand, in a case where it is decided in step S160 that the motion has ended, the "relaxation" execution process is ended.

Since the autonomous moving object 11 performs a digital motion representation in the manner described above, the ability in expression of the autonomous moving object 11 is enhanced. For example, a movement of the autonomous moving object 11 can be emphasized visually and auditorily, and visual and auditory performance effects can be enhanced. For example, it is possible to make clearer a movement of the body of the autonomous moving object 11 or a sense of rhythm in music of samba or the like. For example, cuteness of the autonomous moving object 11 can further be emphasized. For example, by changing the coat of hair in response to stroking performed on the autonomous moving object 11, the ability in expression can be made closer to that of an existing creature (in the present case, a dog).

Further, it is possible to represent individuality of the autonomous moving object 11. For example, by representing a design of a coat of hair, a costume, or the like by the light emission section 105, and by changing the design according to a situation or providing an individual difference in the design, individuality of each autonomous moving object 11 can be represented. Consequently, each autonomous moving object 11 can be discriminated from other autonomous moving objects 11, and it is expected that the affection of the user for its autonomous moving object 11 is increased.

2. MODIFICATIONS

In the following, modifications of the embodiment of the present technology described above are described.

The configuration of the light emission section 105 is not restricted to the example described hereinabove. For example, the light emission section 105 may be configured such that it projects a video, light, or the like from the inside of the autonomous moving object 11 to the exterior to change the color or brightness of the surface of the autonomous moving object 11.

For example, the autonomous moving object 11 may also move a portion other than the eyes (for example, the mouth, the ears, the nose, or the like) to change the facial expression.

For example, the autonomous moving object 11 may perform a digital motion representation (for example, a dance or the like) to music outputted externally.

For example, the information processing section 103 of FIG. 9 may be provided partly or entirely in the information processing terminal 12 or the information processing server 13, so that the information processing terminal 12 or the information processing server 13 may perform control of the digital motion representation of the autonomous moving object 11. In this case, for example, contact information and movement information, or information indicative of a result of detection of a contact action and a movement of the autonomous moving object 11, is transmitted from the autonomous moving object 11 to the information processing terminal 12 or the information processing server 13. Further, for example, motion data is transmitted from the information processing terminal 12 or the information processing server 13 to the autonomous moving object 11.

The present technology can also be applied to an autonomous moving object that imitates, for example, a creature other than the dog described hereinabove (for example, a human, a cat, an insect, fish, or the like). Further, the present technology can also be applied to an autonomous moving object that imitates, for example, a fictitious creature or a personified substance.

3. OTHERS

Example of Configuration of Computer

The series of processes described above can be executed by hardware or by software. In a case where the series of processes is executed by software, a program that constitutes the software is installed into a computer. The computer here includes a computer incorporated in hardware for exclusive use, a personal computer, for example, for universal use that can execute various functions by having various programs installed therein, and so forth.

Figure 18:
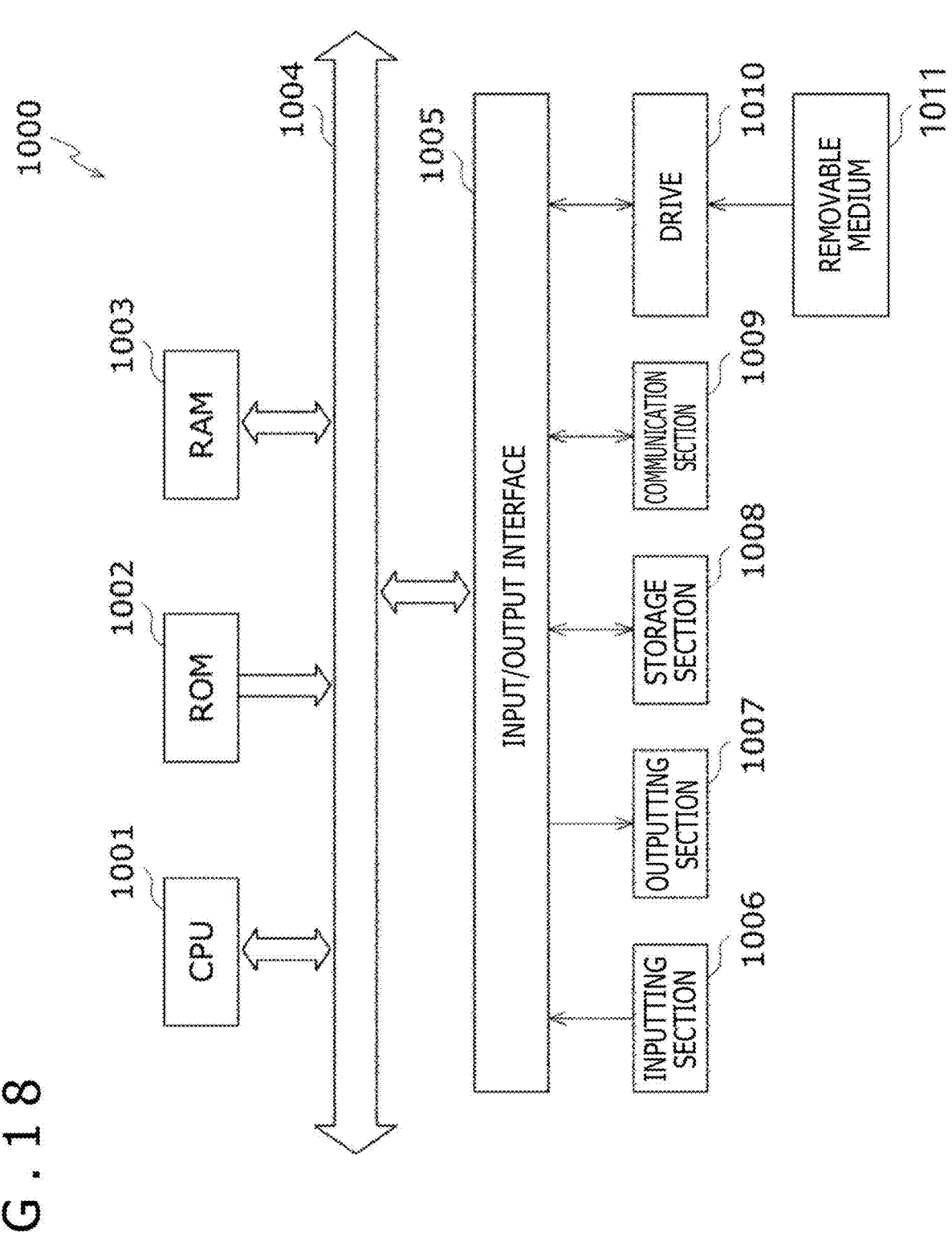
FIG. 18 is a view depicting an example of a configuration of a computer.

FIG. 18 is a block diagram depicting an example of a hardware configuration of a computer that executes the series of processes described hereinabove in accordance with a program.

In a computer 1000, a CPU (Central Processing Unit) 1001, a ROM (Read Only Memory) 1002, and a RAM (Random Access Memory) 1003 are connected to one another by a bus 1004.

Further, an input/output interface 1005 is connected to the bus 1004. An inputting section 1006, an outputting section 1007, a storage section 1008, a communication section 1009, and a drive 1010 are connected to the input/output interface 1005.

The inputting section 1006 includes an input switch, a button, a microphone, an imaging element, and so forth. The outputting section 1007 includes a display, a speaker, and so forth. The storage section 1008 includes a hard disk, a nonvolatile memory, or the like. The communication section 1009 includes a network interface or the like. The drive 1010 drives a removable medium 1011 such as a magnetic disk, an optical disk, a magneto-optical disk, or a semiconductor memory.

In the computer 1000 configured in the manner described above, for example, the CPU 1001 loads a program recorded in the storage section 1008 into the RAM 1003 through the input/output interface 1005 and the bus 1004 and executes the program, to thereby carry out the series of processes described above.

The program to be executed by the computer 1000 (CPU 1001) can be recorded on and provided as the removable medium 1011, for example, in the form of a package medium or the like. Further, the program can be provided through a wired or wireless transmission medium such as a local area network, the Internet, or digital satellite broadcasting.

In the computer 1000, the program can be installed into the storage section 1008 through the input/output interface 1005 by loading the removable medium 1011 into the drive 1010. Further, the program can be received by the communication section 1009 through a wired or wireless transmission medium and installed into the storage section 1008. Alternatively, the program can be installed in advance in the ROM 1002 or the storage section 1008.

It is to be noted that the program executed by the computer may be a program in which processing is performed in a time series in the order as described in the present specification or may be a program in which processes are performed in parallel or performed each at a necessary timing when it is called or the like.

Further, in the present specification, a system signifies a set of multiple components (devices, modules (parts), or the like), and it does not matter whether or not all components are in the same housing. Accordingly, both multiple apparatuses that are accommodated in different housings and are connected to one another via a network and a single apparatus in which multiple modules are accommodated in one housing are systems.

Further, the embodiment of the present technology is not limited to the embodiment described hereinabove and can be altered in various manners without departing from the subject matter of the present technology.

For example, the present technology can adopt a configuration of cloud computing in which one function is shared and cooperatively processed by multiple apparatuses through a network.

Further, the steps described hereinabove with reference to the flow charts not only can be executed by a single apparatus but also can be shared and executed by multiple apparatuses.

Further, in a case where one step includes multiple processes, the multiple processes included in the one step not only can be executed by one apparatus but also can be shared and executed by multiple apparatuses.

Example of Combination of Configurations

The present technology can adopt the following configurations.

(1)

An autonomous moving object that operates autonomously, including:

a light emission section that changes a color and brightness of a surface of the autonomous moving object; and a motion controlling section that controls a light emission pattern that is a pattern of the color and brightness of the light emission section, on the basis of a state of the autonomous moving object.

(2)

The autonomous moving object according to (1) above, in which the motion controlling section associates a movement of the autonomous moving object with the light emission pattern.

(3)

The autonomous moving object according to (2) above, in which the motion controlling section changes the light emission pattern in such a manner as to emphasize the movement of the autonomous moving object.

(4)

The autonomous moving object according to (3) above, in which the motion controlling section associates a movement of a leg of the autonomous moving object with the light emission pattern.

(5)

The autonomous moving object according to (4) above, in which the motion controlling section associates a direction in which the leg of the autonomous moving object moves, with a direction in which the light emission pattern on the leg changes.

(6)

The autonomous moving object according to (4) or (5) above, in which the motion controlling section associates a speed at which the autonomous moving object walks or runs, with a speed at which the light emission pattern on the leg changes.

(7)

The autonomous moving object according to any of (4) to (6) above, in which the motion controlling section synchronizes a timing at which the autonomous moving object starts walking or running and a timing at which the autonomous moving object stops walking or running, with timings at which a change of the light emission pattern is started and stopped, respectively.

(8)

The autonomous moving object according to any of (3) to (7) above, in which the motion controlling section associates a movement at a time when the autonomous moving object shakes its body, with the light emission pattern.

(9)

The autonomous moving object according to any of (2) to (8) above, in which the motion controlling section associates a movement of the autonomous moving object with a change of a design represented by the light emission pattern.

(10)

The autonomous moving object according to (9) above, in which the design represents at least one of a costume or a coat of hair of the autonomous moving object.

(11)

The autonomous moving object according to (10) above, in which the motion controlling section associates music with a movement of the autonomous moving object and a change of the costume represented by the light emission pattern.

(12)

The autonomous moving object according to any of (2) to (11) above, in which the motion controlling section further associates a movement of the autonomous moving object with at least one of sound or a facial expression of the autonomous moving object.

(13)

The autonomous moving object according to any of (1) to (12) above, in which the motion controlling section changes a design represented by the light emission pattern, on the basis of the state of the autonomous moving object.

(14)

The autonomous moving object according to (13) above, in which the design represents at least one of a costume or a coat of hair of the autonomous moving object.

(15)

The autonomous moving object according to (14) above, in which the motion controlling section changes the coat of hair represented by the light emission pattern, on the basis of a relation between a direction of the coat of hair and a direction in which the autonomous moving object is stroked.

(16)

The autonomous moving object according to (14) or (15) above, in which the motion controlling section controls at least one of a facial expression or a cry of the autonomous moving object on the basis of a relation between a direction of the coat of hair and a direction in which the autonomous moving object is stroked.

(17)

The autonomous moving object according to any of (1) to (16) above, in which the light emission section includes multiple light emitting devices that are arranged on the surface of the autonomous moving object and are variable in color and brightness.

(18)

An information processing method including:

controlling, on the basis of a state of an autonomous moving object that operates autonomously, a light emission pattern that is a pattern of a color and brightness of a light emission section that changes a color and brightness of a surface of the autonomous moving object.

It is to be noted that the advantageous effects described in the present specification are exemplary to the last and are not restrictive, and other advantageous effects may also be provided.

REFERENCE SIGNS LIST

1: Information processing system
11-1 to 11-$n$: Autonomous moving object
12-1 to 12-$n$: Information processing terminal
13: Information processing server
51L, 51R: Display
57: Touch sensor
59: Sole button
60: Inertia sensor
71: Actuator
101: Contact information acquisition section
102: Movement information acquisition section
103: Information processing section
104: Driving section
105: Light emission section
106: Sound outputting section
107: Display section
121: Contact information processing section
122: Movement information processing section
123: Motion data retention section
124: Motion controlling section
125: Driving controlling section
126: Light emission controlling section
127: Sound output controlling section
128: Display controlling section

The invention claimed is:

1. An autonomous moving object, comprising:

a light emission section configured to change at least one of a color of a surface of the autonomous moving object or a brightness of the surface of the autonomous moving object; and a motion controlling section configured to control a light emission pattern of the light emission section, based on a state of the autonomous moving object, wherein the light emission pattern is a pattern of the color of the surface of the autonomous moving object and the brightness of the surface of the autonomous moving object, a speed of change of the light emission pattern of the light emission section is based on a speed at which the autonomous moving object walks or runs, and the light emission pattern changes by movement of a lighted portion on the surface of the autonomous moving object.

2. The autonomous moving object according to claim 1, wherein the motion controlling section is further configured to associate a movement of a leg of the autonomous moving object with the light emission pattern.

3. The autonomous moving object according to claim 2, wherein the motion controlling section is further configured to associate a direction of a change of the light emission pattern on the leg with a direction of the movement of the leg of the autonomous moving object.

4. The autonomous moving object according to claim 2, wherein the motion controlling section is further configured to:

synchronize a timing, at which the autonomous moving object starts the walk or the run, with a timing at which the change in the light emission pattern is started; and synchronize a timing, at which the autonomous moving object stops the walk or the run, with a timing at which the change of the light emission pattern is stopped.

5. The autonomous moving object according to claim 1, wherein the motion controlling section is further configured to associate a movement, at a time at which a body of the autonomous moving object is shaken, with the light emission pattern.

6. The autonomous moving object according to claim 1, wherein the motion controlling section is further configured to associate a movement of the autonomous moving object with a change of a design represented by the light emission pattern.

7. The autonomous moving object according to claim 6, wherein the design represents at least one of a costume of the autonomous moving object or a coat of hair of the autonomous moving object.

8. The autonomous moving object according to claim 7, wherein the motion controlling section is further configured to associate a music, of the movement of the autonomous moving object, with a change of the costume represented by the light emission pattern.

9. The autonomous moving object according to claim 1, wherein the motion controlling section is further configured to associate a movement of the autonomous moving object with at least one of sound of the autonomous moving object or a facial expression of the autonomous moving object.

10. The autonomous moving object according to claim 1, wherein the motion controlling section is further configured to change a design represented by the light emission pattern, based on the state of the autonomous moving object.

11. The autonomous moving object according to claim 10, wherein the design represents at least one of a costume of the autonomous moving object or a coat of hair of the autonomous moving object.

12. The autonomous moving object according to claim 11, wherein the motion controlling section is configured to change the coat of hair represented by the light emission pattern, based on a relation between a direction of the coat of hair and a direction in which the autonomous moving object is stroked.

13. The autonomous moving object according to claim 11, wherein the motion controlling section is further configured to control at least one of a facial expression of the autonomous moving object or a cry of the autonomous moving object, based on a relation between a direction of the coat of hair and a direction in which the autonomous moving object is stroked.

14. The autonomous moving object according to claim 1, wherein the light emission section includes a plurality of light emitting devices, the plurality of light emitting devices are on the surface of the autonomous moving object, and the plurality of light emitting devices are variable in color and brightness.

15. An information processing method, comprising:

controlling, based on a state of an autonomous moving object, a light emission pattern of a light emission section, wherein the light emission section changes at least one of a color of a surface of the autonomous moving object or a brightness of the surface of the autonomous moving object, the light emission pattern is a pattern of the color of the surface of the autonomous moving object and the brightness of the surface of the autonomous moving object, a speed of change of the light emission pattern of the light emission section is based on a speed at which the autonomous moving object walks or runs, and the light emission pattern changes by movement of a lighted portion on the surface of the autonomous moving object.

* * * * *